United States Patent
Oe et al.

(10) Patent No.: US 9,758,020 B2
(45) Date of Patent: Sep. 12, 2017

(54) REGISTER

(71) Applicant: TOYOTA JIDOSHA KABUSHIKI KAISHA, Toyota-shi (JP)

(72) Inventors: Hiroyuki Oe, Toyota (JP); Yoko Ishiguro, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 307 days.

(21) Appl. No.: 14/409,119

(22) PCT Filed: Apr. 19, 2013

(86) PCT No.: PCT/JP2013/061605
§ 371 (c)(1),
(2) Date: Dec. 18, 2014

(87) PCT Pub. No.: WO2014/020952
PCT Pub. Date: Feb. 6, 2014

(65) Prior Publication Data
US 2015/0174989 A1 Jun. 25, 2015

(30) Foreign Application Priority Data
Aug. 1, 2012 (JP) ................. 2012-171491

(51) Int. Cl.
*B60H 1/34* (2006.01)
*F24F 13/14* (2006.01)
(52) U.S. Cl.
CPC ............. *B60H 1/34* (2013.01); *B60H 1/3421* (2013.01); *F24F 13/14* (2013.01)
(58) Field of Classification Search
CPC .................................................... B60H 1/34
(Continued)

(56) References Cited

U.S. PATENT DOCUMENTS

2008/0081550 A1 4/2008 Shibata et al.
2010/0011799 A1 1/2010 Sakakibara
2010/0261422 A1 10/2010 Sakakibara

FOREIGN PATENT DOCUMENTS

CN 101448661 A 6/2009
DE 10 2010 035 079 A1 2/2012
(Continued)

OTHER PUBLICATIONS

Chinese Search Report issued Feb. 21, 2016 in Patent Application No. 2013800408635 (with English Translation of categories of cited documents).
(Continued)

*Primary Examiner* — Helena Kosanovic
(74) *Attorney, Agent, or Firm* — Oblon, McClelland, Maier & Neustadt, L.L.P.

(57) ABSTRACT

The front movable louver (3) includes one central fin (7) and an upper auxiliary fin (8) and a lower auxiliary fin (9) storable in storing recesses (6a, 6b) inside an air outlet. The central fin (7) is axially supported turnably by pivots (7a) provided on both sides of the vicinity of the downstream side end portion. The upper auxiliary fin (8) and the lower auxiliary fin (9) are axially supported turnably so as to stick out their downstream side end portions to the passage (5) side by pivots provided on both sides of the vicinities of the upstream side end portions. A cam link mechanism (10) turns the upper auxiliary fin (8) and the lower auxiliary fin (9) so that the upper auxiliary fin (8) sticks out its downstream side end portion to the passage side, and the lower auxiliary fin (9) becomes parallel to and approaches the central fin (7) so that these fins function as one large fin when the central fin (7) is turned in the short-side direction of the air outlet (15).

6 Claims, 13 Drawing Sheets

(58) Field of Classification Search
USPC .......................................................... 454/152
See application file for complete search history.

(56) References Cited

FOREIGN PATENT DOCUMENTS

| | | |
|---|---|---|
| JP | 11 321282 | 11/1999 |
| JP | 2002 103954 | 4/2002 |
| JP | 2004 175233 | 6/2004 |
| JP | 2004 217088 | 8/2004 |
| JP | 2008 87514 | 4/2008 |
| JP | 2010 105507 | 5/2010 |
| JP | 2012-30718 A | 2/2012 |
| JP | 2013 6587 | 1/2013 |
| WO | WO 2007/148658 A1 | 12/2007 |

OTHER PUBLICATIONS

International Search Report Issued Jun. 25, 2013 in PCT/JP13/061605 Filed Apr. 19, 2013.
Extended European Search Report issued Dec. 10, 2015 in Patent Application No. 13825376.0.

REGISTER

TECHNICAL FIELD

The present invention relates to a register for air blow adjustment to be used at an air outlet for air conditioning of an automobile, etc., and specifically, to a register that is suitable for a thin register having a narrow and long air outlet.

As registers for air blow adjustment to be used for air outlets for air conditioning of automobiles, etc., registers which have horizontal movable louvers and vertical movable louvers disposed on the front and rear sides in orthogonal directions inside bezels or retainers forming air passages, and adjust an air blowing direction upward/downward and rightward/leftward by changing angles of each fin of the horizontal movable louvers and the vertical movable louvers when blowing out air from the air outlets provided on the bezels have been commonly used for air conditioners, etc., of automobiles.

As these types of registers, thin registers each having a narrow and long rectangular-shaped air outlet and a small number of movable fins, approximately 1 to 3, provided inside the air outlet are sometimes installed in the interiors of automobiles mainly because of designability or design demands (refer to, for example, Patent Document 1).

In such a thin register, a front movable louver having approximately 1 to 3 horizontal fins is disposed along the longitudinal direction of the narrow and long air outlet inside the narrow and long air outlet, and the horizontal fins of the front movable louver are disposed along the longitudinal direction of the narrow and long air outlet.

CITATION LIST

Patent Literature

Patent Document 1: JP2002-103954 A

SUMMARY OF THE INVENTION

Technical Problem

Therefore, when the horizontal fins of the front movable louver are turned up or down to orient the air blowing direction obliquely upward or obliquely downward, in the thin register in which the vertical widths of the air passage and the air outlet are short, an air flow the speed of which is comparatively high flows straight along the upper and lower wall surfaces of the air passage. Therefore, for example, when the horizontal fins are turned up, an air flow flowing straight near the upper wall surface disturbs the obliquely upward air flow, and on the other hand, when the horizontal fins are turned down, an air flow flowing straight near the lower wall surface easily disturbs the obliquely downward air flow, and therefore, directionality of the wind when the horizontal fins are turned up or down is easily deteriorated.

This kind of thin register normally has an air outlet that is inclined so as to be long in the longitudinal direction and short in the short-side direction and is inclined in the short-side direction, and depending on the total design, the inclination of the front surface of the register, that is, the inclination angle of the air outlet with respect to a vertical plane increases (the inclination angle with respect to a horizontal plane becomes small).

There is a problem that in such a thin register having an air outlet the front surface of which is inclined, in particular, in the case where the front fin is turned to the inclination side (downward), the air flow on the lower side is blown out straight forward along the lower wall surface of the air outlet, so that the air flow on the lower side interferes with the obliquely downward air flow, and accordingly, directionality of the wind when blowing downward is easily deteriorated, and as the inclination angle of the air outlet front surface with respect to a vertical plane increases, the directionality of downward blowing is more easily deteriorated.

The present invention was made to solve the above-described problem, and an object thereof is to provide a register capable of improving directionality of the wind when the front movable louver is turned.

Solution to Problem

A register according to the present invention is a register having a narrow and long rectangular-shaped air outlet, with a front movable louver that is provided with a plurality of front fins turnably and disposed inside the air outlet, in which the front movable louver is constituted so that while one central fin is axially supported at substantially the center of the inside of the air outlet turnably around an axis parallel to the longitudinal direction of the air outlet, a pair of auxiliary fins are axially supported in such a manner that the auxiliary fins are storable in storing recesses provided on the wall surfaces on both sides inside the air outlet and turnable around axes parallel to the axis of the central fin while being parallel to the central fin, the central fin is axially supported turnably by pivots provided on both sides of the vicinity of the downstream side end portion, and the pair of auxiliary fins are axially supported turnably so as to stick out their downstream side end portions to a passage side by pivots provided on both sides of the vicinities of the upstream side end portions, a cam link mechanism is provided which turns the auxiliary fins so that when the central fin is turned in the short-side direction of the air outlet, one of the auxiliary fins sticks out its downstream side end portion to the passage side, and the other auxiliary fin becomes parallel to and approaches the central fin so that these fins function as one large fin, and the cam link mechanism is constituted so that a plurality of cam grooves are provided in a cam plate axially supported rotatably, and in the cam grooves, an engagement pin of a link member joined to the pivot of the central fin is engaged and engagement pins of link members joined to the pivots of the pair of auxiliary fins are engaged.

Here, the upstream side or the downstream side mean the upstream side or the downstream side of an air flow flowing in the passage, and on each member, the front portion means a portion on the downstream side, and the rear portion means a portion on the upstream side. The wall surfaces on both sides on which the storing recesses are provided are up and down wall surfaces when the air outlet is horizontally long, and are right and left wall surfaces when the air outlet is vertically long.

According to the present invention, when the central fin is turned in the short-side direction of the air outlet, that is, turned up or down in the case where the air outlet is horizontally long, or turned right or left in the case where the air outlet is vertically long, one of the auxiliary fins on both sides becomes parallel to the central fin and these fins approach each other and function as one large fin, so that directionality of the wind when the central fin is turned can be improved.

Further, when the central fin is turned, one auxiliary fin and the central fin function as one large fin, and the other auxiliary fin sticking out to the passage side operates to press the air flow against the central fin, an air flow blown straight forward along the wall surfaces inside the air outlet is prevented from being generated, and directionality of the wind when the front movable louver is turned up, down, right or left is improved.

The cam link mechanism is constituted so that a plurality of cam grooves are provided in a cam plate axially supported rotatably, and in the cam grooves, an engagement pin of a link member joined to the pivot of the central fin is engaged, and engagement pins of link members joined to the pivots of the pair of auxiliary fins are engaged, so that the cam link mechanism can be constituted by a simple structure with a very small number of components including one cam plate and three link members, and accordingly, the mechanism moves smoothly, and even when the cam link mechanism is disposed on the outside of the side wall of the register main body, the cam plate and link members do not stick out from the register main body, and the cam link mechanism can be constituted to be compact.

The pivots of the central fin are positioned near the downstream side end portion, so that when the central fin is turned, portions to appear on the front side and change are few, and accordingly, appearance of the register is improved. In addition, the pivots of the central fin are positioned near the downstream end portion, so that the forward projecting length of the operation knob fitted slidably to the central fin can be increased, and accordingly, the operability of the operation knob can be improved.

Here, in the register described above, it is preferable that in the cam plate of the cam link mechanism described above, two cam grooves in which engagement pins of the link members of the pair of auxiliary fins engage are formed into symmetrical shapes, and the rotary shaft of the cam plate is disposed on the upstream side further than the tip end positions of the auxiliary fins. Accordingly, movement of the cam link mechanism to operate the pair of auxiliary fins that turn in conjunction with the movement of the central fin can be made smoother and more compact. Accordingly, portions sticking out to the outside of the register main body are eliminated, and the register can be fitted even in a small space, and the auxiliary fins can be smoothly turned according to a turning operation of the central fin.

A register according to another invention is a register having a narrow and long air outlet that is long in the horizontal direction and short in the up-down vertical direction, with a front movable louver disposed along the horizontal direction in the inner front portion of the air outlet, where the air outlet is formed to incline so as to retract its upper portion to the upstream side and project its lower portion to the downstream side, in which the front movable louver is constituted so that while one central horizontal fin is axially supported in the horizontal direction turnably at substantially the up-down center of the inside the air outlet, an upper auxiliary horizontal fin is axially supported so as to be storable and turnable in the horizontal direction in a storing recess provided on the upper wall surface inside the air outlet, and a lower auxiliary horizontal fin is axially supported so as to be storable and turnable in the horizontal direction in a storing recess provided on the lower wall surface inside the air outlet, the central horizontal fin is axially supported turnably by pivots provided on both sides of the vicinity of the downstream end portion, and the upper auxiliary horizontal fin and the lower auxiliary horizontal fin are axially supported turnably so as to stick out their downstream side end portions to the passage side by pivots provided on both sides of the vicinities of the upstream end portions, a cam link mechanism is provided so as to, when the central horizontal fin is turned up or down, turn the upper auxiliary horizontal fin or the lower auxiliary horizontal fin sticks out its downstream side end portion to the passage side, and the lower auxiliary horizontal fin or the upper auxiliary horizontal fin becomes parallel to and approach the central horizontal fin so that these fins function as one large fin, and the cam link mechanism is constituted so that a plurality of cam grooves are formed in a cam plate axially supported rotatably, and in the cam grooves, an engagement pin of a link member joined to the pivot of the central horizontal fin and engagement pins of link members joined to the pivots of the upper auxiliary horizontal fin and the lower auxiliary horizontal fin are engaged.

According to this invention, when the central horizontal fin is turned up or down, the upper auxiliary horizontal fin or the lower auxiliary horizontal fin becomes parallel to the central horizontal fin and these fins approach each other and function as one large fin, so that directionality of the wind when the central horizontal fin is turned can be improved.

In particular, when the central horizontal fin is turned to the lower side of the air outlet, the upper auxiliary horizontal fin and the central horizontal fin function as one large fin, and the lower auxiliary horizontal fin sticking out to the passage side operates so as to press the air flow against the side wall of the central horizontal fin, so that directionality of the wind when the central horizontal fin is turned to the lower side of the air outlet can be improved.

The cam link mechanism is constituted so that a plurality of cam grooves are provided in a cam plate, and in the cam grooves, an engagement pin of a link member joined to the pivot of the central horizontal fin is engaged and engagement pins of link members joined to the pivots of the upper auxiliary horizontal fin and the lower auxiliary horizontal fin are engaged, so that the cam link mechanism can be constituted by a simple structure with a very small number of components including one cam plate and three link members, and accordingly, movement of the mechanism becomes smooth, and even when the cam link mechanism is disposed on the outside of the side wall of the register main body, the cam plate and link members do not stick out from the register main body, and the cam link mechanism can be constituted to be compact.

A register according to still another invention is a register having a narrow and long air outlet that is long in the up-down vertical direction and short in the horizontal direction, with a front movable louver disposed along the up-down vertical direction in the inner front portion of the air outlet, where the air outlet is formed to be inclined so as to retract one side portion to the upstream side and project the other side portion to the downstream side, in which the front movable louver is constituted so that while one central vertical fin is axially supported in the up-down vertical direction turnably at substantially the right-left center of the retraction side inside the air outlet, a retraction-side auxiliary vertical fin is axially supported so as to be storable and turnable in the up-down vertical direction in a storing recess provided on the side wall surface on the projection side inside the air outlet, and a projection-side auxiliary vertical fin is axially supported so as to be storable and turnable in the up-down vertical direction in a storing recess provided on the side wall surface inside the air outlet, the central vertical fin is axially supported turnably by pivots provided on both sides of the vicinity of the downstream side end portion, and the retraction-side auxiliary vertical fin and the projection-side auxiliary vertical fin are axially supported turnably so as to stick out their downstream side end portions to the passage side by pivots provided on both sides of the vicinities of the upstream side end portions, a cam link mechanism is provided so as to, when the central vertical fin is turned right or left, make the retraction-side auxiliary vertical fin and the projection-side auxiliary vertical fin stick out their downstream side end portions to the passage side, and make the projection-side auxiliary vertical fin or the retraction-side auxiliary vertical fin become parallel to and approach the central vertical fin and cause these fins to function as one large fin, and the cam link mechanism is constituted so that a plurality of cam grooves are provided in a cam plate axially supported rotatably, and in the cam grooves, an engagement pin of a link member joined to the pivot of the central vertical fin is engaged and engagement pins of link members joined to the pivots of the retraction-side auxiliary vertical fin and the projection-side auxiliary vertical fin are engaged.

According to this invention, when the central vertical fin is turned right or left, the retraction-side auxiliary vertical fin or the projection-side auxiliary vertical fin becomes parallel to the central vertical fin and these fins approach each other and function as one large fin, so that directionality of the wind when the central vertical fin is turned right or left can be improved.

In particular, when the central vertical fin is turned to the projection side of the air outlet, the retraction-side auxiliary vertical fin and the central vertical fin function as one large fin, and the projection-side auxiliary vertical fin sticking out to the passage side operates to press the air flow against the side surface of the central vertical fin and prevents an air flow that is blown straight forward along the wall surfaces inside the air outlet from being generated, so that directionality of the wind when the central vertical fin is turned to the projection side of the air outlet can be improved.

In addition, the cam link mechanism is constituted so that a plurality of cam grooves are provided in a cam plate, and in the cam grooves, an engagement pin of a link member joined to the pivot of the central vertical fin is engaged and engagement pins of link members joined to the pivots of the retraction-side auxiliary vertical fin and the projection-side auxiliary vertical fin are engaged, so that the cam link mechanism can be constituted by a simple structure with a very small number of components including one cam plate and three link members, and accordingly, movement of the mechanism becomes smooth, and even when the cam link mechanism is disposed on the outside of the side wall of the register main body, the cam plate and the link members do not stick out from the register main body, so that the cam link mechanism can be constituted to be compact.

Effects of the Invention

With a register according to the present invention, even if it is a thin register having a narrow and long air outlet, directionality of the wind when the front movable fin is turned can be improved, and the constitution and operation of the cam link mechanism can be made compact, and the cam link mechanism can be prevented from sticking out from the register main body.

EMBODIMENT FOR CARRYING OUT THE INVENTION

Figure 1:
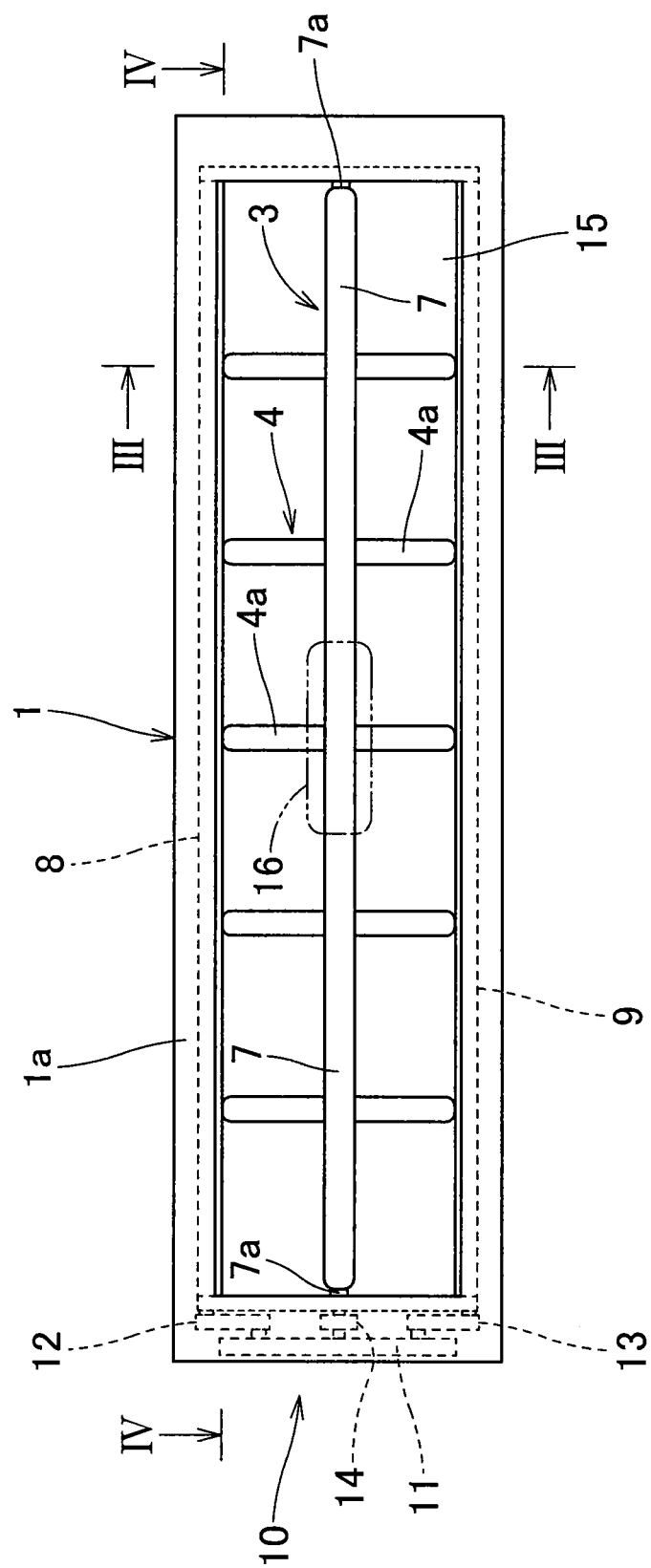
FIG. 1 is a front view of a register showing a first embodiment of the present invention.

Hereinafter, an embodiment of the present invention is described with reference to the drawings. FIG. 1 to FIG. 6 show a register according to a first embodiment, and a register main body 1 of the register includes a bezel 1a forming a design surface by opening a horizontally-long rectangular-shaped air outlet 15 in the front face, and a duct-shaped retainer 2 connected to the rear portion upstream side of the bezel 1a.

The air outlet 15 of the bezel 1a is formed into a rectangular shape narrow and long in the horizontal direction, and assumes a horizontally-long rectangular shape long in the longitudinal direction (horizontal direction) and short in the short-side direction (up-down vertical direction), and the cross-sectional shape of the retainer 2 is also formed into a horizontally-long rectangular shape, and these constitute a so-called thin register.

On the back surface side of the bezel 1a, a fitting portion (not shown) for joining to the retainer 2 is provided, and to this fitting portion, the retainer 2 is fitted and connected. On the right and left side walls inside the air outlet 15 of the bezel 1a, bearing portions for the front movable louver 3 are formed, and on both bearing portions, pivots 7a projecting from both side end portions of the central horizontal fin 7 of the front movable louver 3 are supported, and similarly, pivots 8a projecting from both side end portions of an upper auxiliary horizontal fin 8 and pivots 9a projecting from both sides of a lower auxiliary horizontal fin 9 are supported on the bearing portions on both side wall portions. Accordingly, the central horizontal fin 7, the upper auxiliary horizontal fin 8, and the lower auxiliary horizontal fin 9 are axially supported so as to be turnable up and down in a predetermined angle range.

The central horizontal fin 7, the upper auxiliary horizontal fin 8, and the lower auxiliary horizontal fin 9 constitute examples of the central fin and the pair of auxiliary fins as constituent elements of the present invention.

Figure 3:
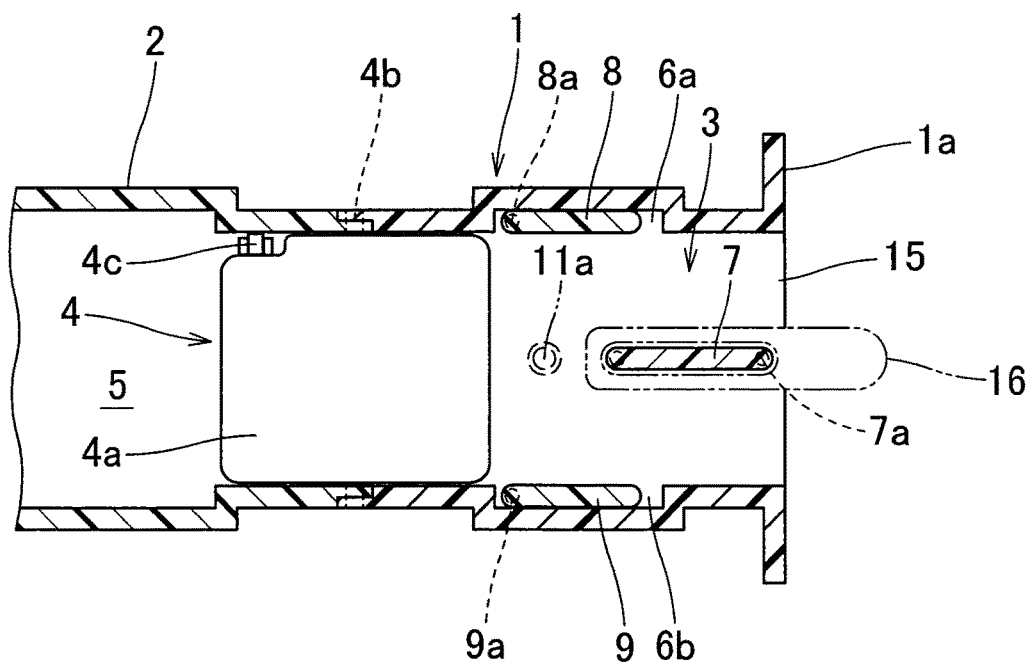
FIG. 3 is a sectional view taken along III-III in FIG. 1.
Figure 4:
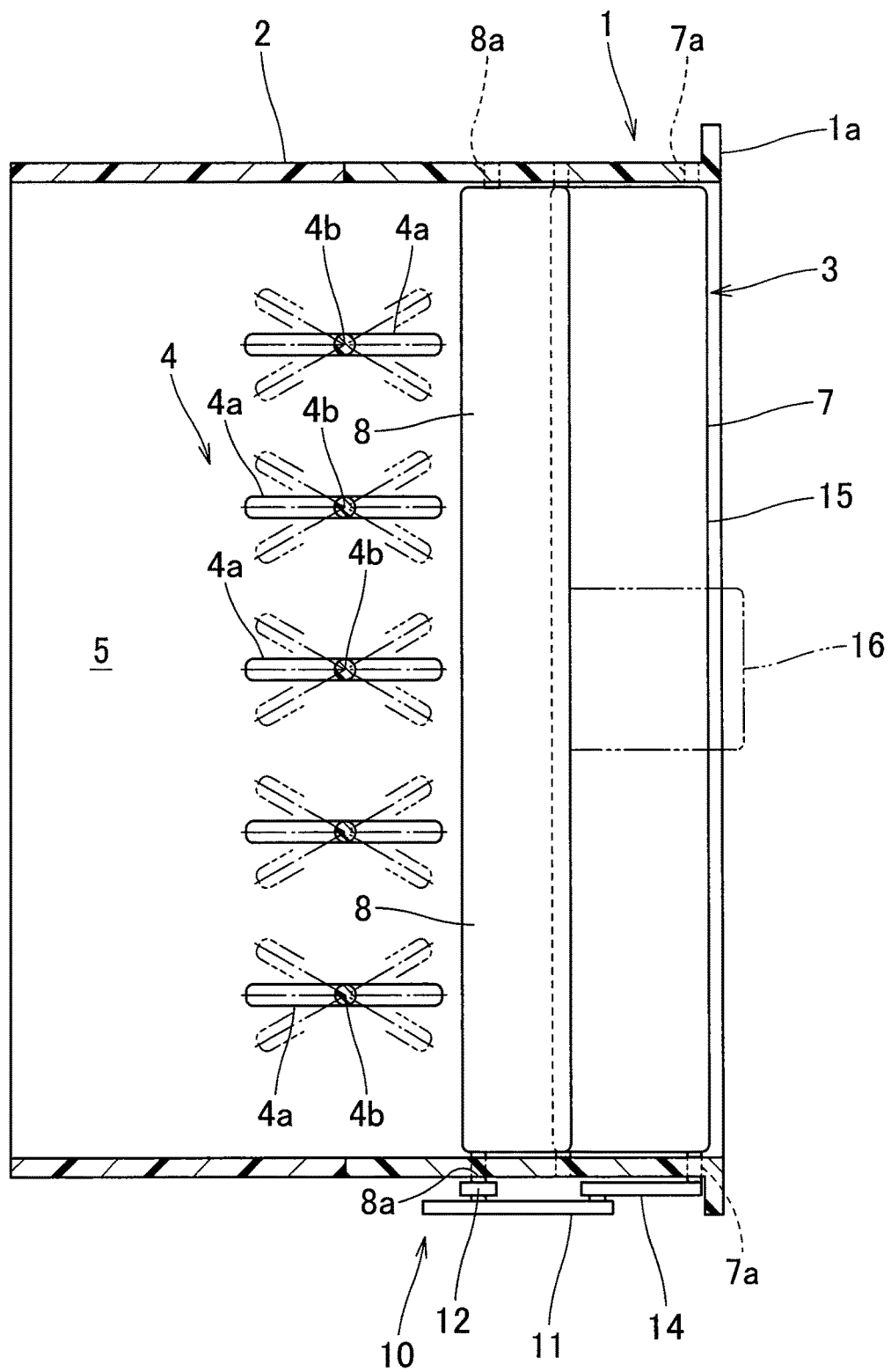
FIG. 4 is a sectional view taken along IV-IV in FIG. 1.

The retainer 2 is formed into a duct shape with a horizontally-long rectangular cross section, and a passage 5 for ventilation is formed inside. Bearing portions are formed at predetermined intervals on the upper wall and the lower wall of the downstream side edge portion of the retainer 2, and on these bearing portions, as shown in FIG. 3 and FIG. 4, vertical fins 4a of the rear movable louver 4 are axially supported by pivots 4b. Each vertical fin 4a of the rear movable louver 4 turns right and left in a predetermined angle range in conjunction with each other. To the front portion of this retainer 2, the bezel 1a in which the substantially rectangular air outlet 15 is opened is fitted in a state where the air outlet 15 is aligned with the opening of the passage 5, and the passage 5 is formed communicating from the inside of the retainer 2 to the air outlet 15 of the bezel 1a.

The front movable louver 3 includes one central horizontal fin 7 whose up-down turning is adjustable, an upper auxiliary horizontal fin 8 and a lower auxiliary horizontal fin 9 which are disposed at positions above and below the central horizontal fin 7 and turn up and down according to a turning operation of the central horizontal fin 7, and the cam link mechanism 10 that turns the upper auxiliary horizontal fin 8 and the lower auxiliary horizontal fin 9 in conjunction with turning of the central horizontal fin 7.

Figure 2:
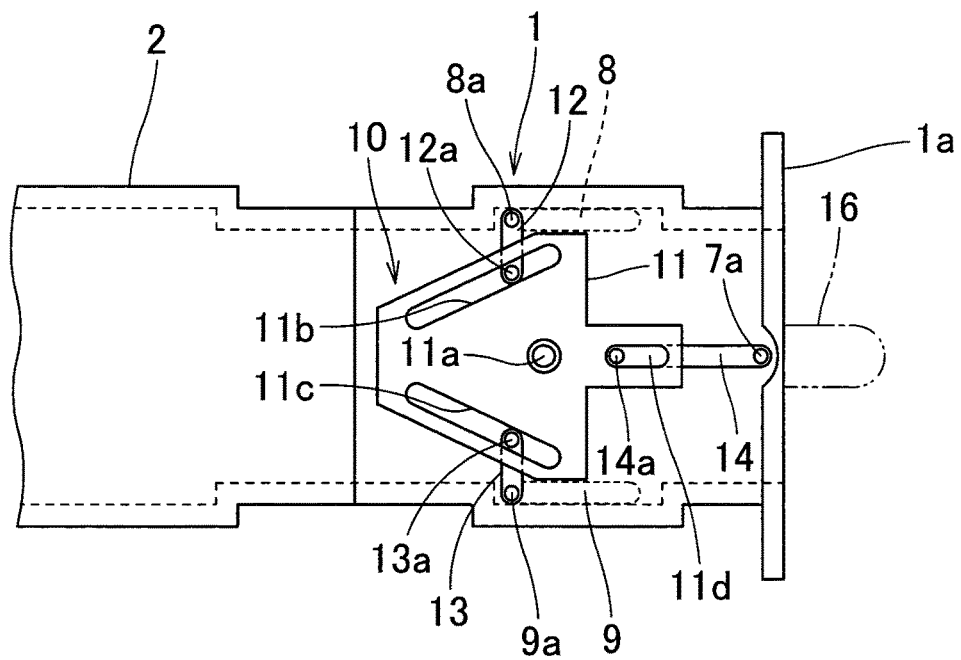
FIG. 2 is a left side view of the same register.

As shown in FIG. 1 and FIG. 2, the cam link mechanism 10 is disposed on the outside of the side wall of the register main body 1, and axially supports one cam plate 11 turnably by a rotary shaft 11a. In the cam plate 11, a cam groove 11d for the central horizontal fin 7, and cam grooves 11b and 11c for the upper auxiliary horizontal fin 8 and the lower auxiliary horizontal fin 9 are formed. The rotary shaft 11a of the cam plate 11 is disposed on the upstream side further than the tip end positions of the upper auxiliary horizontal fin 8 and the lower auxiliary horizontal fin 9, and at symmetrical positions on both upper and lower sides of the rotary shaft 11a, the cam grooves 11b and 11c are formed to have symmetrical shapes (symmetrical with respect to the center line of the cam plate) as shown in FIG. 2. The cam groove 11d for the central horizontal fin 7 is formed to be close to the front portion of the cam plate 11.

The central horizontal fin 7 is disposed along the longitudinal direction of the air outlet 15 at substantially the center in the longitudinal direction, and from both ends of the fin, pivots 7a are projected, and inside the air outlet 15, the central horizontal fin 7 is axially supported so as to be turnable up and down via both pivots 7a. As shown in FIG. 1, FIG. 2, and FIG. 4, one pivot 7a penetrates through the side wall of the passage 5 and projects to the outside, and to the tip end of this pivot 7a, a link member 14 is axially fitted. From the tip end of the link member 14 of the central horizontal fin 7, an engagement pin 14a is projected, and this engagement pin 14a engages in the cam groove 11d of the cam plate 11.

As shown in FIG. 1 and FIG. 3, the pivots 7a of the central horizontal fin 7 are positioned at substantially the center of the passage 5 in a front view, the upper auxiliary horizontal fin 8 is disposed horizontally above the central horizontal fin 7, and the lower auxiliary horizontal fin 9 is disposed horizontally below the central horizontal fin 7. From both ends of the upper auxiliary horizontal fin 8, pivots 8a are projected, and further, from both ends of the lower auxiliary horizontal fin 9, pivots 9a are projected, and the pivots 8a and 9a on both sides are inserted through pivot holes provided in the side walls of the register main body 1 and supported turnably. The positions of the pivots 8a and 9a of the upper auxiliary horizontal fin 8 and the lower auxiliary horizontal fin 9 are at the upstream side end portions of each fin in a side view, the front portions of the upper auxiliary horizontal fin 8 and the lower auxiliary horizontal fin 9 are free ends, and as described later, according to a turning operation of the central horizontal fin 7, the upper auxiliary horizontal fin 8 and the lower auxiliary horizontal fin 9 stick out their front portions being free ends to the passage 5 side.

As shown in FIG. 3, on the upper wall surface inside the register main body 1, a storing recess 6a is formed, and the upper auxiliary horizontal fin 8 axially supported by the pivots 8a is stored in a horizontal state inside the storing recess 6a and the front end portion thereof is turnable down. In addition, on the lower wall surface inside the register main body 1, a storing recess 6b is formed, and the lower auxiliary horizontal fin 9 axially supported by the pivots 9a is stored in a horizontal state inside the storing recess 6b and the front end portion thereof is turnable up. That is, on the upper and lower wall surfaces inside the air outlet 15 in the register main body 1, the storing recess 6a and the storing recess 6b are formed, and inside the upper storing recess 6a, the upper auxiliary horizontal fin 8 can be stored in a horizontal state. The upper auxiliary horizontal fin 8 is axially supported in such a manner that the front end portion thereof is turnable down from the horizontal state. Inside the lower storing recess 6b, the lower auxiliary horizontal fin 9 can be stored in a horizontal state, and the lower auxiliary horizontal fin 9 is axially supported in such a manner that the front end portion thereof is turnable up from the horizontal state.

One pivot 8a of the upper auxiliary horizontal fin 8 penetrates through the side wall and projects to the outside, and to the tip end of this pivot 8a, a link member 12 is axially fitted, and from the tip end of the link member 12, an engagement pin 12a is projected. Similarly, one pivot 9a of the lower auxiliary horizontal fin 9 penetrates through the side wall and projects to the outside, and to the tip end of this pivot 9a, a link member 13 is axially fitted, and from the tip end of the link member 13, an engagement pin 13a is projected. The engagement pin 12a engages in the cam groove 11b of the cam plate 11 constituted as described above, and the engagement pin 13a engages in the cam groove 11c of the cam plate 11. Further, as described above, the cam groove 11d is formed in the front portion of the cam plate 11, and in the cam groove 11d, the engagement pin 14a of the link member 14 axially fitted to the pivot 7a of the central horizontal fin 7 engages.

With this constitution of the cam link mechanism 10, as shown in FIG. 5, when the central horizontal fin 7 is turned up, the upper auxiliary horizontal fin 8 turns to orient its front end portion obliquely downward and stick out to the passage 5 side, and the lower auxiliary horizontal fin 9 turns to orient its front end portion toward the central horizontal fin 7 side so as to become parallel to and approach the central horizontal fin 7 and these fins function as one large fin. As shown in FIG. 6, when the central horizontal fin 7 is turned down, the lower auxiliary horizontal fin 9 turns to orient its front end portion obliquely upward and stick out to the passage 5 side, and the upper auxiliary horizontal fin 8 turns to orient its front end portion toward the central horizontal fin 7 side so as to become parallel to and approach the central horizontal fin 7 so that these fins function as one large fin.

In particular, for the cam plate 11 of the cam link mechanism 10, a constitution in which the cam groove 11b in which the engagement pin 12a of the link member 12 of the upper auxiliary horizontal fin 8 engages and the cam groove 11c in which the engagement pin 13a of the link member 13 of the lower auxiliary horizontal fin 9 engages are formed at symmetrical positions, and the rotary shaft 11a of the cam plate 11 is disposed on the upstream side further than the tip end positions of the upper auxiliary horizontal fin 8 and the lower auxiliary horizontal fin 9, that is, a constitution in which a very small number of components including only one cam plate and three link members are used and the shapes of each component and shapes of the cam grooves are very simple, is adopted.

Accordingly, as shown in FIG. 5 and FIG. 6, the constitution of the cam link mechanism 10 can be made compact, and the movement of the cam link mechanism 10 that turns the upper auxiliary horizontal fin 8 and the lower auxiliary horizontal fin 9 in conjunction with the movement of the central horizontal fin 7 can also be made compact.

Therefore, like the register main body 1 of a thin register, even if the register main body is low in height, portions of the cam link mechanism 10 sticking out to the outside of the register main body 1 are eliminated and the register can be attached even in a small space. As shown in FIG. 5 and FIG. 6, even during operation of the register, the cam plate 11 and the link members 12, 13, and 14 of the cam link mechanism 10 do not stick out from the upper surface or lower surface of the register main body 1.

Further, the cam link mechanism 10 uses a very small number of components including only one cam plate 11 and three link members 12, 13, and 14 and the shapes of each component and the shapes of the cam grooves can be formed to be very simple, so that when the central horizontal fin 7 is turned up or down, the upper auxiliary horizontal fin 8 and the lower auxiliary horizontal fin 9 can be turned very smoothly.

On the other hand, inside the passage 5 on the upstream side of the front movable louver 3, as shown in FIG. 3 and FIG. 4, the rear movable louver 4 is disposed. In the rear movable louver 4, a plurality of vertical fins 4a are provided vertically so as to be juxtaposed at predetermined intervals in the right-left direction. On each vertical fin 4a, pivots 4a are projected from the upper and lower portions, and the upper and lower pivots 4b are axially supported on bearing portions provided on the upper and lower walls of the passage 5 and supported so as to be turnable right and left.

To the central horizontal fin 7, as shown in FIG. 1, an operation knob 16 is externally fitted so as to be slidable in the longitudinal direction so that the operation knob 16 is grasped so as to be able to turn the central horizontal fin 7 up and down, and by sliding the operation knob 16 in the right-left direction, the rear movable louver 4 is turned right or left to change the wind direction to the right or left.

For this structure, for example, as linkage portions, a rack portion (not shown) is provided on the rear portion of the operation knob 16 and a fan-shaped gear portion is provided on one vertical fin 4a of the rear movable louver 4, and the rack portion and the gear portion mesh with each other, and when the operation knob 16 is slid, the vertical fin 4a turns. On the upper portions of all vertical fins 4a including the vertical fin 4a having the gear portion, as shown in FIG. 3, joint shafts 4c are provided to deviate from the pivots 4b, and one link bar is joined to these joint shafts 4c, and when the operation knob 16 is slid to the right or left on the central horizontal fin 7, each vertical fin 4a of the rear movable louver 4 turns right or left in conjunction with the operation knob 16 to adjust the wind direction to the right or left.

Next, operation of the register constituted as described above is described based on FIG. 5 and FIG. 6, etc. The register is fitted to a portion of an instrument panel or a dashboard inside an automobile by connecting the air inlet on the back surface side to an air duct (not shown).

To blow wind straight forward of the register, as shown in FIG. 3, the central horizontal fin 7 of the front movable louver 3 is brought into a horizontal state, that is, oriented straight forward. In this state, the upper auxiliary horizontal fin 8 and the lower auxiliary horizontal fin 9 keep their horizontal states, and are stored in the storing recesses 6a and 6b on the upper and lower wall surfaces of the passage 5. Therefore, the air flow flowing in the passage 5 is blown horizontally forward to which the central horizontal fin 7 is oriented with very small pressure loss and little air resistance from the upper auxiliary horizontal fin 8 and the lower auxiliary horizontal fin 9. Accordingly, in comparison with a normal register including three horizontal fins juxtaposed in the air outlet, the pressure loss during horizontal adjustment can be made smaller.

Figure 5A:
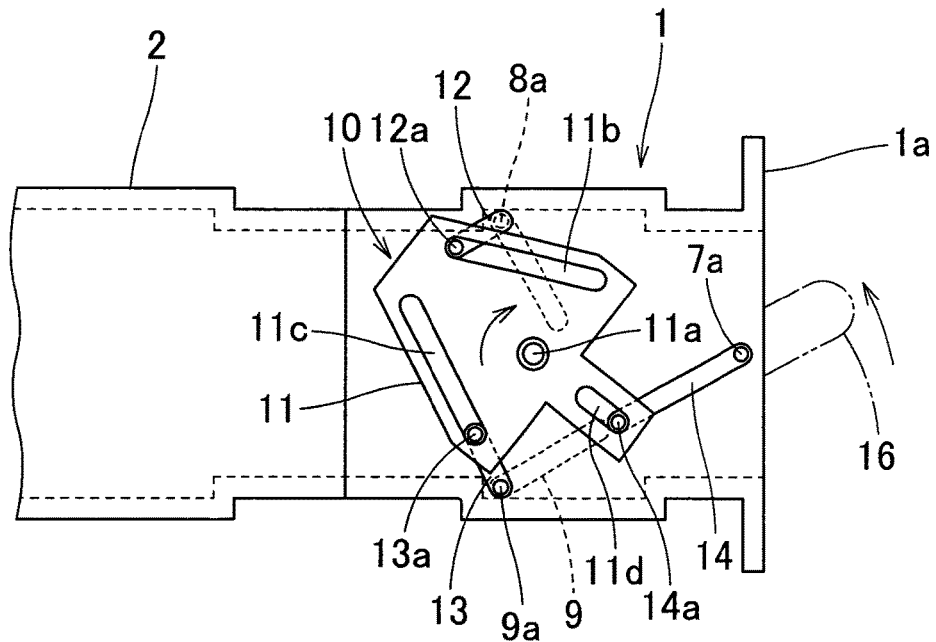
FIG. 5(a) is a left side view and FIG. 5(b) is a sectional view when the front movable louver is turned up.

On the other hand, while the central horizontal fin 7 is in the horizontal state as described above, when the operation knob 16 is operated to turn the central horizontal fin 7 up as shown in FIG. 5, the turning force is transmitted to the cam plate 11 of the cam link mechanism 10 via the link member 14, the engagement pin 14a, and the cam groove 11d, and the cam plate 11 turns a predetermined angle in a direction (clockwise in FIG. 5) the reverse of the rotation of the central horizontal fin 7 as shown in FIG. 5a.

At this time, by the action of the engagement pin 12a engaging in the cam groove 11b of the cam plate 11 and the link member 12, the upper auxiliary horizontal fin 8 turns obliquely downward so as to stick out its downstream side end portion to the inside of the passage 5, and by the action of the engagement pin 13a that engages in the cam groove 11c of the cam plate 11 and the link member 13, the lower auxiliary horizontal fin 9 turns obliquely upward, and at the same time, the lower auxiliary horizontal fin 9 orients its front end portion toward the central horizontal fin 7 side so as to become parallel to and approach the central horizontal fin 7 and these fins function as one large fin.

Figure 5B:
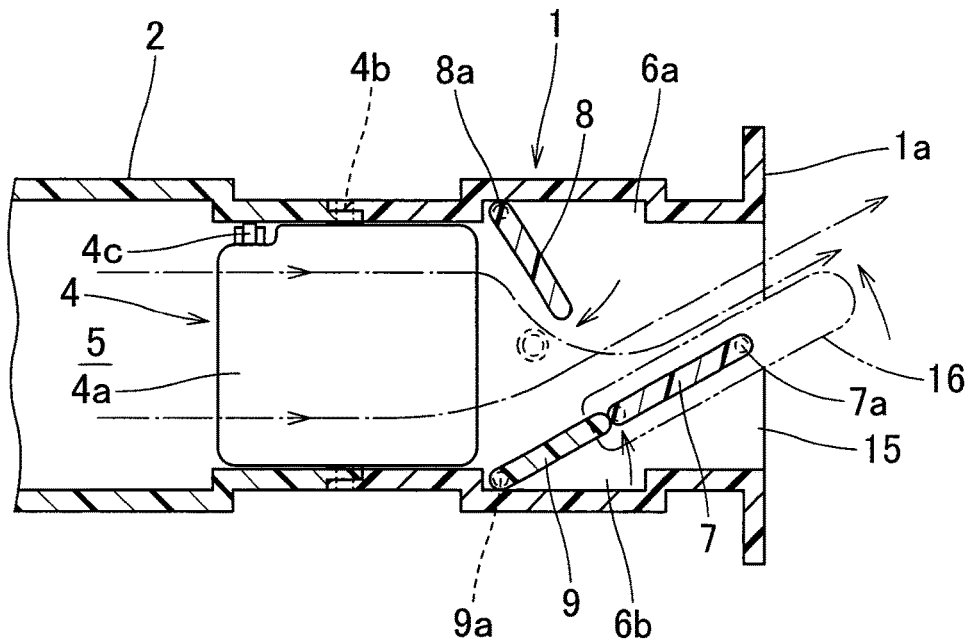

Accordingly, as shown in FIG. 5b, the air flow flowing from the passage 5 toward the air outlet 15 is gathered near the periphery of the up-down center of the passage 5 by the upper auxiliary horizontal fin 8 and the lower auxiliary horizontal fin 9, and particularly, the air flow flowing in the upper portion of the passage 5 is pressed against the upper surface of the central horizontal fin 7 by the upper auxiliary horizontal fin 8 oriented obliquely downward, and the air flow gathered near the periphery of the central horizontal fin 7 flows along the central horizontal fin 7 and is blown obliquely upward to which the central horizontal fin 7 is oriented.

As shown in FIG. 5b, the lower auxiliary horizontal fin 9 orients its front end portion toward the central horizontal fin 7 side so as to become parallel to and approach the central horizontal fin 7, that is, the front end portion of the lower auxiliary horizontal fin 9 becomes parallel to and approaches the rear end portion of the central horizontal fin 7, and these fins function as one large fin, so that the air flows flowing toward the central horizontal fin 7 and the lower auxiliary horizontal fin 9 can be efficiently bent obliquely upward and blown. Further, the upper auxiliary horizontal fin 8 and the lower auxiliary horizontal fin 9 turn so as to stick out from the storing recesses 6a and 6b to the passage 5, so that an air flow flowing straight forward in the gap between the upper wall surface and the lower wall surface is hardly generated, and the air flow gathered near the periphery of the central horizontal fin 7 flows along the central horizontal fin 7 and can be efficiently blown obliquely upward to which the central horizontal fin 7 is oriented.

Thus, the lower auxiliary horizontal fin 9 orients its front end portion toward the central horizontal fin 7 side so as to become parallel to and approach the central horizontal fin 7 and these fins function as one large fin, and the upper auxiliary horizontal fin 8 turns down from the storing recess 6a and sticks out its downstream side end portion to the inside of the passage 5 to gather the air flow flowing in the passage 5 near the periphery of the central horizontal fin 7, so that an air flow along the central horizontal fin 7 can be effectively generated, an air flow flowing straight forward in the gap between the upper wall surface of the passage 5 and the upper auxiliary horizontal fin 8 is prevented from being generated, and unlike the normal register provided with three horizontal fins, the air flow flowing along the central horizontal fin 7 is not disturbed. Therefore, the front movable louver 3 smoothly flows wind, and directionality when the central horizontal fin 7 is turned up can be significantly improved.

Figure 6A:
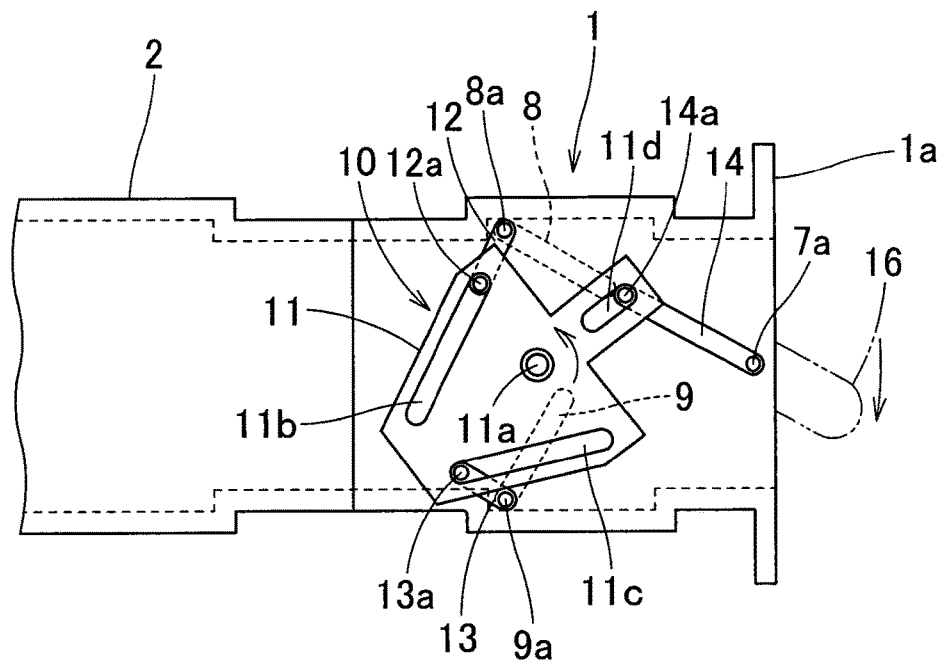
FIG. 6(a) is a left side view and FIG. 6(b) is a sectional view when the front movable louver is turned down.

On the other hand, while the central horizontal fin 7 is in the horizontal state, when the operation knob 16 is operated to turn the central horizontal fin 7 down as shown in FIG. 6, in the same manner as described above, the turning force is transmitted to the cam plate 11 of the cam link mechanism 10 via the link member 14, the engagement pin 14a, and the cam groove 11d, and the cam plate 11 turns a predetermined angle in a direction (counterclockwise in FIG. 6) the reverse of the rotation of the central horizontal fin 7 as shown in FIG. 6a.

At this time, by the action of the engagement pin 12a engaging in the cam groove 11b of the cam plate 11 and the link member 12, the lower auxiliary horizontal fin 9 turns obliquely upward so as to stick out its downstream side end portion to the inside of the passage 5, and by the action of the engagement pin 13a engaging in the cam groove 11c of the cam plate 11 and the link member 13, the lower auxiliary horizontal fin 9 turns obliquely upward, and at the same time, the upper auxiliary horizontal fin 8 orients its front end portion toward the central horizontal fin 7 side so as to become parallel to and approach the central horizontal fin 7 and these fins function as one large fin.

Figure 6B:
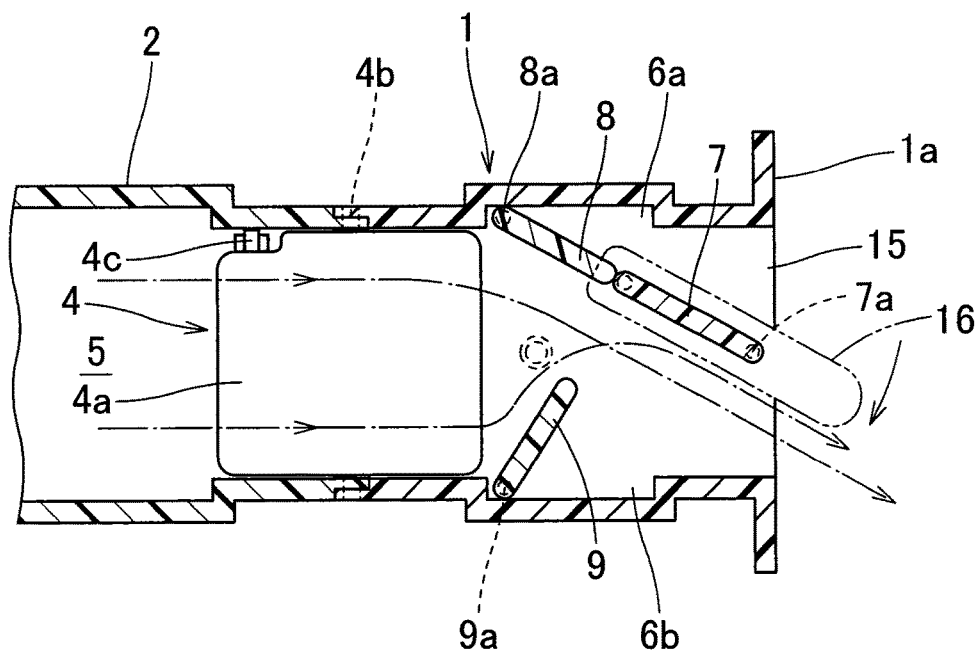

Accordingly, as shown in FIG. 6b, the air flow flowing from the passage 5 toward the air outlet 15 is gathered near the periphery of the up-down center of the passage 5 by the upper auxiliary horizontal fin 8 and the lower auxiliary horizontal fin 9, and particularly, the air flow flowing in the lower portion of the passage 5 is pressed against the lower surface of the central horizontal fin 7 by the lower auxiliary horizontal fin 9 oriented obliquely upward, and the air flow gathered near the periphery of the central horizontal fin 7 flows along the central horizontal fin 7 and is blown obliquely downward to which the central horizontal fin 7 is oriented.

As shown in FIG. 6b, the upper auxiliary horizontal fin 8 orients its front end portion toward the central horizontal fin 7 side so as to become parallel to and approach the central horizontal fin 7, that is, the front end portion of the upper auxiliary horizontal fin 8 becomes parallel to and approaches the rear end portion of the central horizontal fin 7 and these fins function as one large fin, and accordingly, the air flows toward the central horizontal fin 7 and the upper auxiliary horizontal fin 8 can be efficiently bent obliquely downward and blown. Further, the upper auxiliary horizontal fin 8 and the lower auxiliary horizontal fin 9 turn so as to stick out to the passage 5 from the storing recesses 6a and 6b, so that an air flow flowing straight forward in the gap between the upper wall surface and the lower wall surface is hardly generated, and the air flow gathered near the periphery of the central horizontal fin 7 is flowed along the central horizontal fin 7, and can be efficiently blown obliquely downward to which the central horizontal fin 7 is oriented.

Thus, the upper auxiliary horizontal fin 8 orients its front end portion toward the central horizontal fin 7 side so as to become parallel to and approach the central horizontal fin 7 and these fins function as one large fin, and the lower auxiliary horizontal fin 9 turns up from the storing recess 6b and operates so as to stick out its downstream side end portion to the inside of the passage 5 to gather the air flow flowing in the passage 5 near the periphery of the central horizontal fin 7. Therefore, an air flow along the central horizontal fin 7 can be effectively generated, an air flow flowing straight forward in the gap between the upper wall surface of the passage 5 and the upper auxiliary horizontal fin 8 is prevented from being generated, and unlike a normal register provided with three horizontal fins, the air flow flowing along the central horizontal fin 7 is not disturbed, so that wind smoothly flows in the front movable louver 3, and directionality when the central horizontal fin 7 of the front movable louver 3 is turned down can be significantly improved.

On the other hand, to change the wind direction to the right or left, the operation knob 16 on the central horizontal fin 7 is slid to turn the vertical fins 4a of the rear movable louver 4 right or left. Accordingly, each vertical fin 4a of the rear movable louver 4 turns right or left and change their orientations to adjust the wind direction to be blown from the air outlet 15 to the right or left.

The embodiment described above describes the thin register structured so that the register main body 1 has the narrow and long air outlet 15 that is long in the horizontal direction and short in the up-down vertical direction, and the front movable louver 3 is disposed along the horizontal direction in the inner front portion of the air outlet 15, and the present invention is also applicable to a thin register that is a vertical type obtained by rotating the register shown in FIG. 1 90 degrees and structured so that the register main body has a narrow and long air outlet that is long in the up-down vertical direction and short in the right-left horizontal direction, and a front movable louver is disposed along the vertical direction in the inner front portion of the air outlet, and in this case, the same effects as described above can also be obtained. Further, the present invention is also applicable to a register the shape of which is out of the scope of so-called thin registers since the register has an air outlet and a passage the sectional shapes of which are nearly squares.

FIG. 7 to FIG. 10 show a register according to a second embodiment. A register main body 21 of this register has, similar to the register according to the first embodiment, a narrow and long air outlet 35 long in the horizontal direction and short in the up-down vertical direction, and a front movable louver 23 disposed along the horizontal direction in the inner front portion of the air outlet 35, however, the air outlet 35 is inclined so as to retract the upper portion to the upstream side and project the lower portion to the downstream side. That is, the front face of the air outlet 35 provided in the bezel 21a is inclined at approximately 30 degrees obliquely downward with respect to a vertical plane in the short-side direction so as to assume a so-called slant shape.

Figure 8:
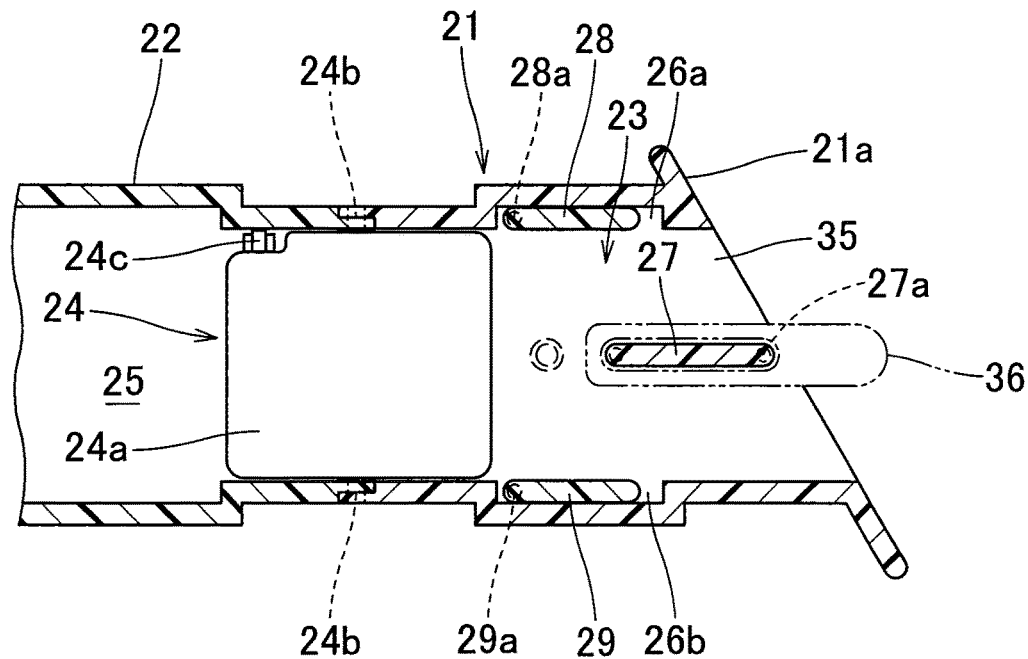
FIG. 8 is a longitudinal sectional view of the register shown in FIG. 7.

The front movable louver 23 is constituted so that, as shown in FIG. 8, while one central horizontal fin 27 is axially supported in the horizontal direction turnably at substantially the up-down center of the inside of the air outlet 35, an upper auxiliary horizontal fin 28 is axially supported so as to be storable and turnable in the horizontal direction in a storing recess 26a provided on the upper wall surface inside the air outlet 35, and a lower auxiliary horizontal fin 29 is axially supported so as to be storable and turnable in the horizontal direction in a storing recess 26b provided on the lower wall surface inside the air outlet 35. The central horizontal fin 27 is axially supported turnably by pivots 27a provided on both sides of the downstream side end portion, and an upper auxiliary horizontal fin 28 and a lower auxiliary horizontal fin 29 are axially supported turnably so as to stick out their downstream side end portions to the passage 5 side by pivots 28a and 29a projected from both sides of the upstream side end portions.

On the back surface side of the bezel 21a of the register main body 21, a fitting portion for joining to a retainer 22 is provided, and the duct-shaped retainer 22 is fitted and connected to the fitting portion. On right and left side walls inside the air outlet 35 of the bezel 21a, bearing portions for the front movable louver 23 are formed, and on the bearing portions on both sides, pivots 27a projecting from both side end portions of the central horizontal fin 27 of the front movable louver 23 are supported. Similarly, pivots 28a projecting from both side end portions of the upper auxiliary horizontal fin 28 and pivots 29a projecting from both sides of the lower auxiliary horizontal fin 29 are supported on the bearing portions on the right and left side walls, and the central horizontal fin 27, the upper auxiliary horizontal fin 28, and the lower auxiliary horizontal fin 29 are turnable up and down in predetermined angle ranges.

The retainer 22 is formed into a substantially rectangular duct shape, and a passage 25 for ventilation is formed inside. On the upper wall and lower wall of the downstream side edge portion of the retainer 22, bearing portions are formed at predetermined intervals, and as shown in FIG. 8, on these bearing portions, vertical fins 24a of the rear movable louver 24 are axially supported by pivots 24b projected from the upper and lower portions so that each vertical fin 24a turns right and left in a predetermined angle range in conjunction with each other. To the front portion of this retainer 22, the bezel 21a having the substantially rectangular air outlet 35 opened in the front face as described above is fitted in a state where the air outlet 35 is aligned with the opening of the passage 25, and the passage 25 is formed communicating from the inside of the retainer 22 to the air outlet 35 of the bezel 21.

The front movable louver 23 includes, as shown in FIG. 8, one central horizontal fin 27 turnable up and down, an upper auxiliary horizontal fin 28 and a lower auxiliary horizontal fin 29 that are disposed at positions above and below the central horizontal fin 27 and turn up and down according to a turning operation of the central horizontal fin 27, and a cam link mechanism 30 that turns the upper auxiliary horizontal fin 28 and the lower auxiliary horizontal fin 29 in conjunction with turning of the central horizontal fin 27.

Figure 7:
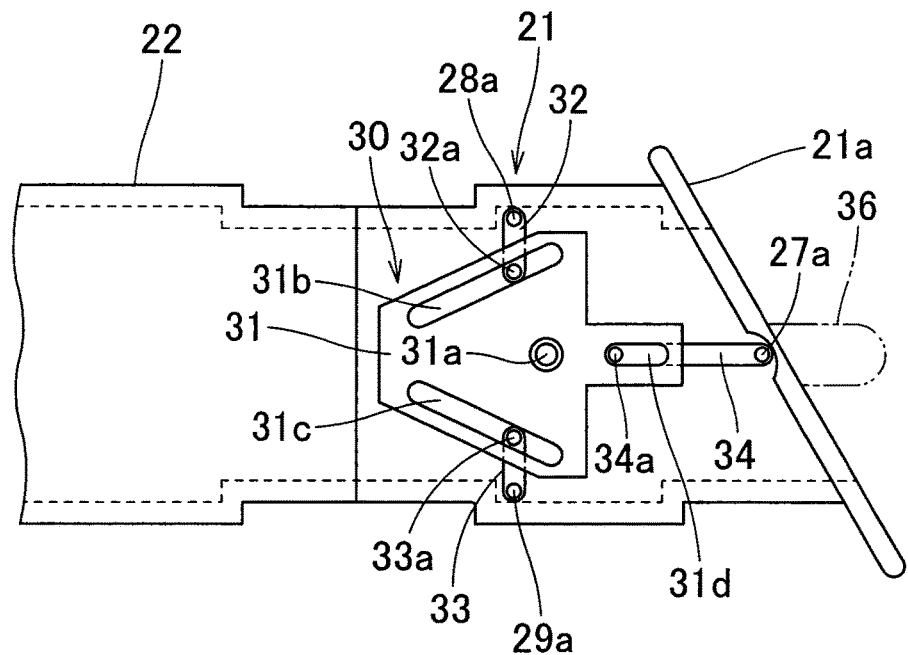
FIG. 7 is a left side view of a register according to a second embodiment.

The central horizontal fin 27 has pivots 27a projected from both ends, one pivot 27a penetrates through the side wall of the passage 25 and projects to the outside, and as shown in FIG. 7 and FIG. 8, to tip end of this pivot 27a, a link member 34 is axially fitted. The pivots 27a of the central horizontal fin 27 are positioned near the front end portion of the fin, and the pivots 28a and 29a of the upper auxiliary horizontal fin 28 and the lower auxiliary horizontal fin 29 are positioned near the upstream side end portions of these fins.

As shown in FIG. 9, when the central horizontal fin 27 is turned up, the upper auxiliary horizontal fin 28 and the lower auxiliary horizontal fin 29 turn so as to stick out their downstream side end portions to the passage 25 side, and the lower auxiliary horizontal fin 29 becomes parallel to the central horizontal fin 27 and these fins approach each other and function as one large fin. That is, when the central horizontal fin 27 is turned obliquely upward, the lower auxiliary horizontal fin 29 becomes parallel to the central horizontal fin 27 and the front end portion of the lower auxiliary horizontal fin 29 approaches the rear end portion of the central horizontal fin 27 so that these fins function as one large fin. Such movements of the upper auxiliary horizontal fin 28 and the lower auxiliary horizontal fin 29 are realized by operation of the cam link mechanism 30.

Figure 10A:
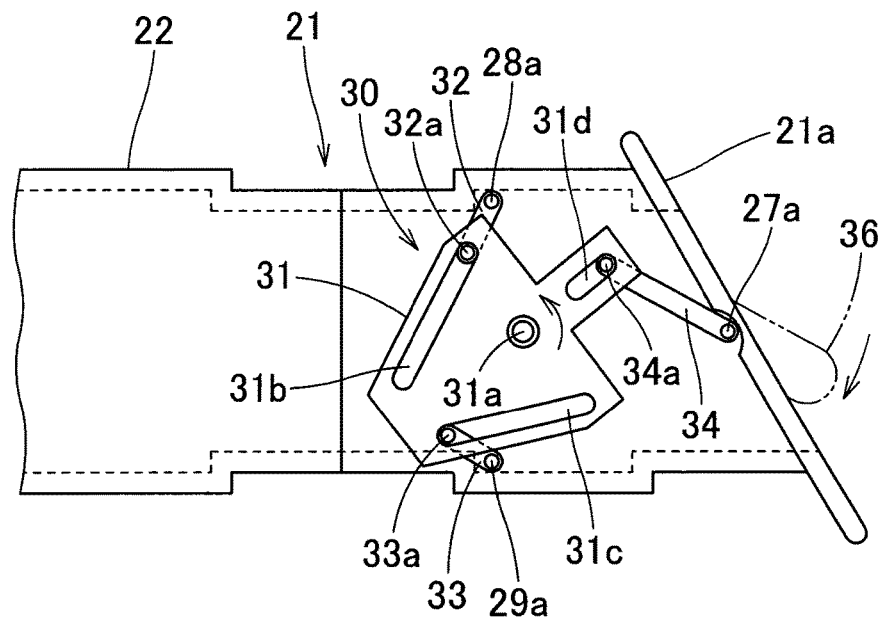
FIG. 10(a) is a left side view and FIG. 10(b) is a sectional view when the front movable louver is turned down.

As shown in FIG. 10, when the central horizontal fin 27 is turned down, the upper auxiliary horizontal fin 28 and the lower auxiliary horizontal fin 29 turn so as to stick out their downstream side end portions to the passage 25 side, and the upper auxiliary horizontal fin 28 becomes parallel to the central horizontal fin 27 and these fins approach each other and function as one large fin. That is, when the central horizontal fin 27 is turned down, the upper auxiliary horizontal fin 28 becomes parallel to the central horizontal fin 27 and the front end portion of the upper auxiliary horizontal fin 28 approaches the rear end portion of the central horizontal fin 27, and these fins function as one large fin. Such movements of the upper auxiliary horizontal fin 28 and the lower auxiliary horizontal fin 29 are realized by the cam link mechanism 30.

As shown in FIG. 8, while the upper auxiliary horizontal fin 28 is disposed near the upper wall surface inside the passage 25, on the upper wall surface, a storing recess 26a is formed, and in this storing recess 26a, the upper auxiliary horizontal fin 28 is stored and concealed in a horizontal state. While the lower auxiliary horizontal fin 29 is disposed near the lower wall surface inside the passage 25, on the lower wall surface, a storing recess 26b is formed, and in this storing recess 26b, the lower auxiliary horizontal fin 29 is stored and concealed in a horizontal state. As described above, the upper auxiliary horizontal fin 28 and the lower auxiliary horizontal fin 29 turn from the horizontal states according to a turning operation of the central horizontal fin 27 so as to stick out their downstream side end portions to the passage 25 side at positions above or below the central horizontal fin.

The pivots 28a of the upper auxiliary horizontal fin 28 are projected from both sides of the vicinity of the upstream side end portion of the upper auxiliary horizontal fin 28, and the pivots 29a of the lower auxiliary horizontal fin 29 are projected from both sides of the vicinity of the upstream side end portion of the lower auxiliary horizontal fin 29. As shown in FIG. 8, the pivots 27a of the central horizontal fin 27 are positioned near the downstream side end portion (front portion side), and the positions of these are on the side opposite to the pivots 28a and 29a of the upper auxiliary horizontal fin 28 and the lower auxiliary horizontal fin 29 which are positioned on the upstream side end portions (rear portion sides).

As described above, when the central horizontal fin 27 is turned up or down, according to operation of the cam link mechanism 30, the upper auxiliary horizontal fin 28 and the lower auxiliary horizontal fin 29 turn in conjunction with the central horizontal fin, and this cam link mechanism 30 includes, as shown in FIG. 7, the link member 34 axially fitted to the pivot 27*a* of the central horizontal fin 27, a link member 32 axially fitted to the pivot 28*a* of the upper auxiliary horizontal fin 28, the link member 33 axially fitted to the pivot 29*a* of the lower auxiliary horizontal fin 29, and a cam plate 31 that engages with the link members 32, 33, and 34 via engagement pins 32*a*, 33*a*, and 34*a*, respectively, and is disposed on the outside portion of the register main body 21.

The cam plate 31 of the cam link mechanism 30 is, as shown in FIG. 7, axially supported on the outside of the side wall of the register main body 21 turnably by a rotary shaft 31*a*. In the cam plate 31, a cam groove 31*d* for the central horizontal fin 27 and cam grooves 31*b* and 31*c* for the upper auxiliary horizontal fin 28 and the lower auxiliary horizontal fin 29 are formed. The rotary shaft 31*a* of the cam plate 31 is disposed on the upstream side further than the tip end positions of the upper auxiliary horizontal fin 28 and the lower auxiliary horizontal fin 29, and at symmetrical positions on the upper and lower sides of the rotary shaft 31*a*, the cam grooves 31*b* and 31*c* are formed to have symmetrical shapes as shown in FIG. 7. The cam groove 31*d* for the central horizontal fin 27 is formed close to the front portion of the cam plate 31.

The central horizontal fin 27 is disposed at substantially the center in the longitudinal direction of the air outlet 35 along the longitudinal direction, provided with pivots 27*a* projected from both ends of the fin, and axially supported so as to be turnable up and down via the pivots 27*a* on both sides. One pivot 27*a* penetrates through the side wall of the passage 5 and projects to the outside, and to the tip end of this pivot 27*a*, a link member 34 is axially fitted. An engagement pin 34*a* is projected from the tip end of the link member 34 of the central horizontal fin 27, and this engagement pin 34*a* engages in the cam groove 31*d* of the cam plate 31.

As shown in FIG. 7, the pivots 27*a* of the central horizontal fin 27 are positioned at substantially the center of the passage 25 in a front view, and the upper auxiliary horizontal fin 28 is disposed horizontally above the central horizontal fin 27, and the lower auxiliary horizontal fin 29 is disposed horizontally below the central horizontal fin 27. From both ends of the upper auxiliary horizontal fin 28, pivots 28*a* are projected, and further, from both ends of the lower auxiliary horizontal fin 29, pivots 29*a* are projected, and the pivots 28*a* and 29*a* on both sides are inserted through pivot holes provided in the side walls of the register main body 21 and supported turnably. The positions of the pivots 28*a* and 29*a* of the upper auxiliary horizontal fin 28 and the lower auxiliary horizontal fin 29 are at the upstream side end portions of each fin in a side view, the front portions of the upper auxiliary horizontal fin 28 and the lower auxiliary horizontal fin 29 are free ends, and as described later, according to a turning operation of the central horizontal fin 27, the upper auxiliary horizontal fin 28 and the lower auxiliary horizontal fin 29 stick out their front end portions being free ends to the passage 5 side.

As shown in FIG. 8, on the upper wall surface inside the register main body 21, a storing recess 26*a* is formed, and the upper auxiliary horizontal fin 28 axially supported by the pivots 28*a* is stored in a horizontal state in the storing recess 26*a* and the front end portion thereof is turnable down. On the lower wall surface inside the register main body 21, a storing recess 26*b* is formed, and the lower auxiliary horizontal fin 29 axially supported by the pivots 29*a* is stored in a horizontal state in the storing recess 26*b* and the front end portion thereof is turnable up.

One pivot 28*a* of the upper auxiliary horizontal fin 28 penetrates through the side wall and projects to the outside, and to the tip end of this pivot 28*a*, a link member 32 is axially fitted, and from the tip end of the link member 32, an engagement pin 32*a* is projected. Similarly, one pivot 29*a* of the lower auxiliary horizontal fin 29 penetrates through the side wall and projects to the outside, and to the tip end of this pivot 29*a*, a link member 33 is axially fitted, and from the tip end of the link ember 33, an engagement pin 33*a* is projected. The engagement pin 32*a* engages in the cam groove 31*b* of the cam plate 31 constituted as described above, and the engagement pin 33*a* engages in the cam groove 31*c* of the cam plate 31.

With this constitution of the cam link mechanism 30, as shown in FIG. 9, when the central horizontal fin 27 is turned up, the upper auxiliary horizontal fin 28 turns to orient its front end portion obliquely downward and stick out to the passage 25 side, and the lower auxiliary horizontal fin 29 turns to orient its front end portion toward the central horizontal fin 27 side and becomes parallel to and approaches the central horizontal fin 27 so that these fins function as one large fin. As shown in FIG. 10, when the central horizontal fin 27 is turned down, the lower auxiliary horizontal fin 29 turns to orient its front end portion obliquely upward and stick out to the passage 25 side, and the upper auxiliary horizontal fin 28 turns to orient its front end portion toward the central horizontal fin 27 side and becomes parallel to and approaches the central horizontal fin 27 so that these fins function as one large fin.

In particular, for the cam plate 31 of the cam link mechanism 30, a constitution in which a cam groove 31*b* in which the engagement pin 32*a* of the link member 32 of the upper auxiliary horizontal fin 28 engages and a cam groove 31*c* in which the engagement pin 33*a* of the link member 33 of the lower auxiliary horizontal fin 29 engages are formed at symmetrical positions, and the rotary shaft 31*a* of the cam plate 31 is disposed at the upstream side further than the tip end positions of the upper auxiliary horizontal fin 28 and the lower auxiliary horizontal fin 29, that is, a constitution in which a very small number of components including only one cam plate and three link members are used, and the shapes of each component and the shapes of the cam grooves are very simple, is adopted.

Accordingly, as shown in FIG. 7 and FIG. 8, the cam link mechanism 30 can be constituted to be compact, and the movement of the cam link mechanism 30 that turns the upper auxiliary horizontal fin 28 and the lower auxiliary horizontal fin 29 in conjunction with movement of the central horizontal fin 27 can also be made compact.

Therefore, like the register main body 21 of the thin register, even if a register main body is low in height, portions of the cam link mechanism 30 sticking out to the outside of the register main body 21 are eliminated and the register can be attached even in a small space. As shown in FIG. 7 and FIG. 8, even during operation of the register, the cam plate 31 and the link members 32, 33, and 34 of the cam link mechanism 30 do not project from the upper surface or lower surface of the register main body 21.

Further, the cam link mechanism 30 includes a very small number of components including only one cam plate 31 and three link members 32, 33, and 34, and the shapes of each component and the cam grooves 31*b*, 31*c*, and 31*d* can be formed into very simple shapes, so that when the central horizontal fin 27 is turned up or down, the upper auxiliary horizontal fin 28 and the lower auxiliary horizontal fin 29 can be turned very smoothly.

On the other hand, inside the passage 25 on the upstream side of the front movable louver 23, as shown in FIG. 8, a rear movable louver 24 is disposed. In the rear movable louver 24, a plurality of vertical fins 24a are provided vertically so as to be juxtaposed at predetermined intervals in the right-left direction. Each vertical fin 24a is provided with pivots 24b projected from the upper portion and the lower portion, and the upper and lower pivots 24b are axially supported on bearing portions provided on the upper wall and the lower wall of the passage 25 so that the vertical fins 24a are supported so as to be turnable right and left.

Further, to the central horizontal fin 27, as shown in FIG. 7, the operation knob 36 is externally fitted slidably in the right-left longitudinal direction so that the operation knob 36 is grasped so as to be able to turn the central horizontal fin 27 up or down, and by sliding the operation knob 36 in the right-left direction, the rear movable louver 24 is turned right or left to change the wind direction to the right or left.

For this structure, for example, as linkage portions, a rack portion is provided on the rear portion of the operation knob 36 and a fan-shaped gear portion is provided on one vertical fin 24a of the rear movable louver 24, and the rack portion and the gear portion mesh with each other, and when the operation knob 36 is slid, the vertical fin 24a turns. On the upper portions of all vertical fins 24a including the vertical fin 24a having the gear portion, as shown in FIG. 8, joint shafts 24c are provided so as to deviate from the pivots 24b, and one link bar is joined to these joint shafts 24c, and when the operation knob 36 is slid to the right or left on the central horizontal fin 27, each vertical fin 24a of the rear movable louver 24 turns right or left in conjunction with the operation knob 36 to adjust the wind direction to the right or left.

Next, operation of the register constituted as described above is described based on FIG. 9 and FIG. 10, etc. To blow wind straight forward of the register, as shown in FIG. 7, the central horizontal fin 27 of the front movable louver 23 is brought into a horizontal state, that is, oriented straight forward. In this state, the upper auxiliary horizontal fin 28 and the lower auxiliary horizontal fin 29 keep their horizontal states, and are stored in the storing recesses 26a and 26b on the upper and lower wall surfaces of the passage 25. Therefore, the air flow flowing in the passage 25 is blown horizontally forward to which the central horizontal fin 27 is oriented with very small pressure loss and little air resistance from the upper auxiliary horizontal fin 28 and the lower auxiliary horizontal fin 29. Accordingly, in comparison with a normal register including three horizontal fins juxtaposed in the air outlet, the pressure loss during horizontal adjustment can be made smaller.

Figure 9A:
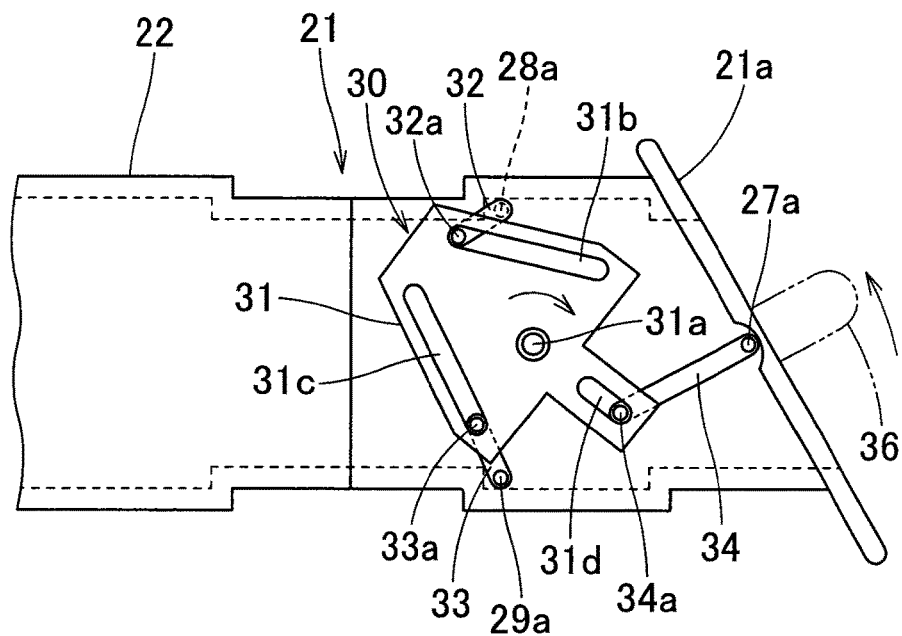
FIG. 9(a) is a left side view and FIG. 9(b) is a sectional view when the front movable louver is turned up.

On the other hand, while the central horizontal fin 27 is in the horizontal state as described above, when the operation knob 36 is operated to turn the central horizontal fin 27 up as shown in FIG. 9, the turning force is transmitted to the cam plate 11 of the cam link mechanism 30 via the link member 34, the engagement pin 34a, and the cam groove 31d, and the cam plate 31 turns a predetermined angle in a direction (clockwise in FIG. 9) the reverse of the rotation of the central horizontal fin 27 as shown in FIG. 9a.

At this time, by the action of the engagement pin 32a engaging in the cam groove 31b of the cam plate 31 and the link member 32, the upper auxiliary horizontal fin 28 turns obliquely downward so as to stick out its downstream side end portion to the inside of the passage 25, and by the action of the engagement pin 33a engaging in the cam groove 31c of the cam plate 31 and the link member 33, the lower auxiliary horizontal fin 29 turns obliquely upward, and at the same time, the lower auxiliary horizontal fin 29 orients its front end portion toward the central horizontal fin 27 side so as to become parallel to and approaches the central horizontal fin 27 and these fins function as one large fin.

Figure 9B:
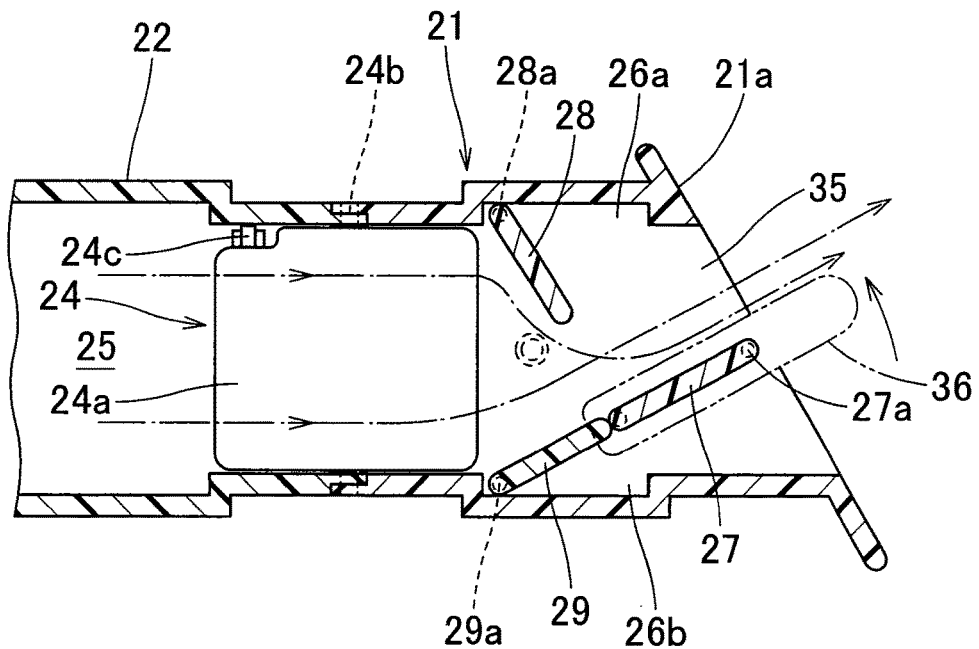

Accordingly, as shown in FIG. 9b, the air flow flowing from the passage 25 toward the air outlet 35 is gathered near the periphery of the up-down center of the passage 25 by the upper auxiliary horizontal fin 28 and the lower auxiliary horizontal fin 29, and particularly, the air flow flowing in the upper portion of the passage 25 is pressed against the upper surface of the central horizontal fin 27 by the upper auxiliary horizontal fin 28 oriented obliquely downward, and the air flow gathered near the periphery of the central horizontal fin 27 flows along the central horizontal fin 27 and is blown obliquely upward to which the central horizontal fin 27 is oriented.

As shown in FIG. 9b, the lower auxiliary horizontal fin 29 orients its front end portion toward the central horizontal fin 27 side so as to become parallel to and approach the central horizontal fin 27, that is, the front end portion of the lower auxiliary horizontal fin 29 becomes parallel to and approaches the rear end portion of the central horizontal fin 27 so that these fins function as one large fin, therefore, the air flows flowing toward the central horizontal fin 27 and the lower auxiliary horizontal fin 29 can be efficiently bent obliquely upward and blown. Further, the upper auxiliary horizontal fin 28 and the lower auxiliary horizontal fin 29 turn so as to stick out from the storing recesses 26a and 26b to the passage 25, so that an air flow flowing straight forward in the gap between the upper wall surface and the lower wall surface is hardly generated, and the air flow gathered near the periphery of the central horizontal fin 27 can be flowed along the central horizontal fin 27 and efficiently blown obliquely upward to which the central horizontal fin 27 is oriented.

Thus, the upper auxiliary horizontal fin 28 turns down from the storing recess 26a and operates so as to stick out its downstream side end portion to the inside of the passage 25 to gather an air flow flowing in the passage 25 near the periphery of the central horizontal fin 27, and the lower auxiliary horizontal fin 29 orients its front end portion toward the central horizontal fin 27 side so as to become parallel to and approach the central horizontal fin 27, therefore, these fins function as one large fin, so that an air flow along the central horizontal fin 27 can be effectively generated, an air flow flowing straight forward in the gap between the upper wall surface of the passage 25 and the upper auxiliary horizontal fin 28 is prevented from being generated, and unlike a normal register provided with three horizontal fins, the air flow flowing along the central horizontal fin 27 is not disturbed. Therefore, even if the register is a thin register and has a narrow and horizontally-long air outlet 35, directionality when the central horizontal fin 27 of the front movable louver 23 is turned up can be significantly improved.

On the other hand, while the central horizontal fin 27 is in a horizontal state, when the central horizontal fin 27 is turned down as shown in FIG. 10 by operating the operation knob 36, the turning force is transmitted to the cam plate 31 of the cam link mechanism 30 via the link member 34, the engagement pin 34a, and the cam groove 31d, and the cam plate 31 turns a predetermined angle in a direction (counterclockwise in FIG. 10) the reverse of the rotation of the central horizontal fin 27.

At this time, by the action of the engagement pin 32a engaging in the cam groove 31b of the cam plate 31 and the link member 32, the lower auxiliary horizontal fin 29 turns obliquely upward so as to stick out its downstream side end portion to the inside of the passage 25, and by the action of the engagement pin 33a engaging in the cam groove 31c of the cam plate 31 and the link member 33, the lower auxiliary horizontal fin 29 turns obliquely upward and, at the same time, the upper auxiliary horizontal fin 28 orients its front end portion toward the central horizontal fin 27 side so as to become parallel to and approach the central horizontal fin 27, that is, the front end portion of the upper auxiliary horizontal fin 28 becomes parallel to and approaches the rear end portion of the central horizontal fin 27 so that these fins function as one large fin.

Figure 10B:
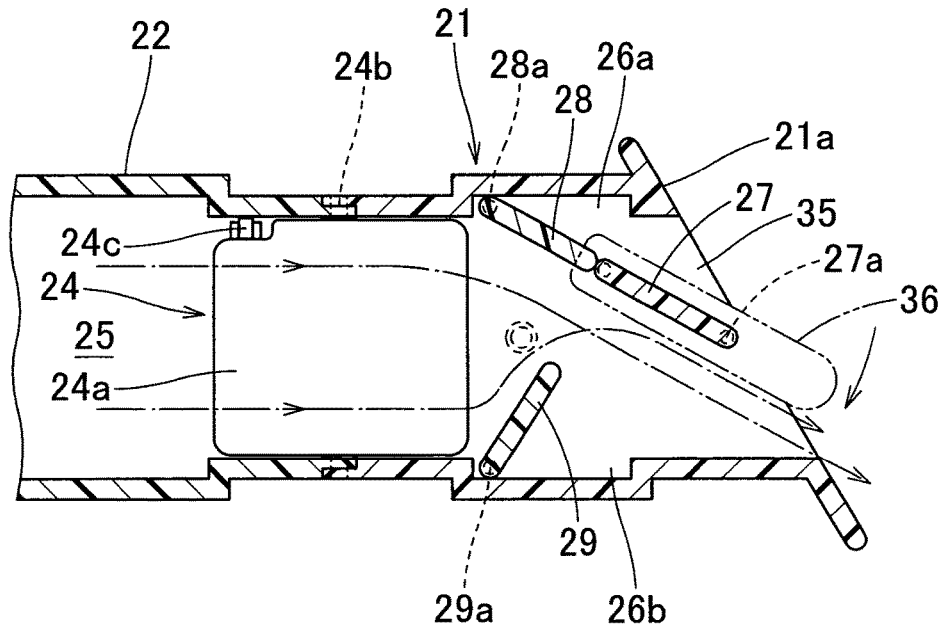

Accordingly, the air flow flowing from the passage 25 toward the air outlet 35 is gathered near the periphery of the up-down center of the passage 25 by the upper auxiliary horizontal fin 28 and the lower auxiliary horizontal fin 29 as shown in FIG. 10b. In particular, the air flow flowing in the lower portion of the passage 25 is pressed against the lower surface of the central horizontal fin 27 by the lower auxiliary horizontal fin 29 oriented obliquely upward, so that the air flow flowing in the lower portion of the passage 25 is blown straight and the downward air flow is not disturbed, and the air flow gathered near the periphery of the central horizontal fin 27 flows along the central horizontal fin 27. Therefore, in particular, even in the case where the narrow and horizontally-long air outlet 35 inclines to project its lower portion, the air flow can be efficiently bent obliquely downward to which the central horizontal fin 27 is oriented and blown.

Further, as shown in FIG. 10b, the upper auxiliary horizontal fin 28 orients its front end portion toward the central horizontal fin 27 side so as to become parallel to and approach the central horizontal fin 27 so that these fins function as one large fin, therefore, even in the case where the air outlet 25 inclines to project its lower portion, the air flows flowing toward the central horizontal fin 27 and the upper auxiliary horizontal fin 28 can be efficiently bent downward and blown.

Thus, the lower auxiliary horizontal fin 29 turns upward from the storing recess 26b and operates so as to stick out its downstream side end portion to the inside of the passage 25 to gather the air flow flowing in the passage 25 near the periphery of the central horizontal fin 27, and the upper auxiliary horizontal fin 28 orients its front end portion toward the central horizontal fin 27 side so as to become parallel to and approach the central horizontal fin 27 so that these fins function as one large fin, therefore, an air flow along the central horizontal fin 27 can be effectively generated, an air flow flowing straight forward in the gap between the upper wall surface of the passage 25 and the upper auxiliary horizontal fin 28 is prevented from being generated, and unlike a normal register provided with three horizontal fins, the air flow flowing along the central horizontal fin is not disturbed. Therefore, even in the case where the register is a thin register and the air outlet 35 inclines downward in the short-side direction, directionality when the central horizontal fin 27 of the front movable louver 23 is turned downward can be significantly improved.

FIG. 11 to FIG. 15 show a register according to a third embodiment. A register main body 41 of this register has a vertical shape obtained by overturning the register 90 degrees according to the second embodiment, and includes a vertically long rectangular air outlet 55 long in the up-down vertical direction and short in the horizontal direction in a bezel 41a, and in the inner front portion of the air outlet 55, a front movable louver 43 is disposed along the up-down vertical direction, and in a front view, the air outlet 55 inclines so that the front portion on one side (left side) is retracted to the upstream side and the front portion on the other side (right side) is projected to the downstream side.

On the back surface side of the bezel 41a of the register main body 41, a fitting portion for joining to a retainer 42 is provided, and the duct-shaped retainer 42 is fitted and connected to the fitting portion. On upper and lower wall portions inside the air outlet 55 of the bezel 41a, bearing portions for the front movable louver 43 are formed, and on the upper and lower bearing portions, pivots 27a projecting from upper and lower end portions of the central vertical fin 47 of the front movable louver 43 are supported. Similarly, pivots 48a projecting from upper and lower portions of the retraction-side auxiliary vertical fin 48 and pivots 49a projecting from upper and lower portions of the projection-side auxiliary vertical fin 49 are supported on the upper and lower bearing portions, respectively, and the central vertical fin 47, the retraction-side auxiliary vertical fin 48, and the projection-side auxiliary vertical fin 49 are turnable right and left in a predetermined angle range.

Figure 13:
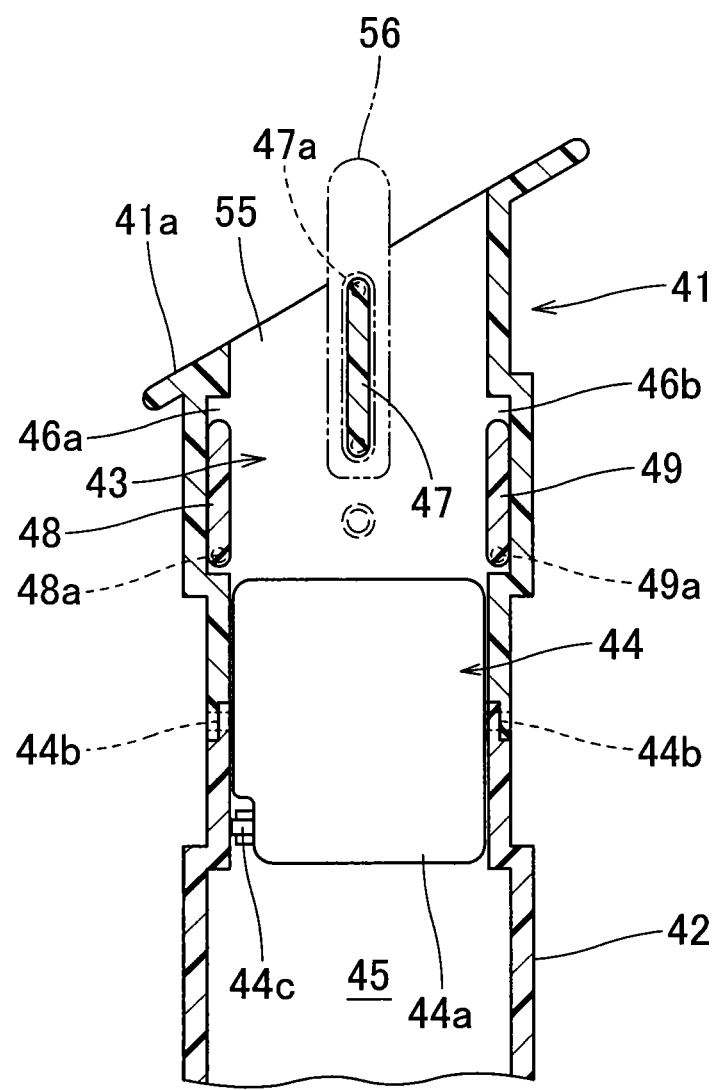
FIG. 13 is a sectional view taken along XIII-XIII of the register shown in FIG. 11.

The retainer 42 is formed into a substantially rectangular duct shape, and a passage 45 for ventilation is formed inside. Bearing portions are formed at predetermined intervals on the left and right wall portions of the downstream side end portion of the retainer 42, and as shown in FIG. 13, on these bearing portions, horizontal fins 44a of the rear movable louver 44 are axially supported by pivots 44b projected from the right and left end portions of the fins so that each horizontal fin 44a turns up and down in a predetermined angle range in conjunction with each other. To the front portion of this retainer 42, the bezel 41a having the vertical rectangular air outlet 55 opened in the front face is fitted in a state where the air outlet 55 is aligned with the opening of the passage 45, and the passage 45 is formed communicating from the inside of the retainer 42 to the air outlet 55 of the bezel 41a.

As shown in FIG. 13 and FIG. 14, the front movable louver 43 is constituted so that one central vertical fin 47 is axially supported turnably in the up-down vertical direction at substantially the right-left center of the inside of the air outlet 55 by pivots 47a, and further, on both sides of the central vertical fin 47, the retraction-side auxiliary vertical fin 48 and the projection-side auxiliary vertical fin 49 are disposed in the up-down vertical direction and axially supported turnably by upper and lower pivots 48a and 49a.

On the side wall surface on the retraction side inside the air outlet 55, a storing recess 46a is provided, and the retraction-side auxiliary vertical fin 48 is axially supported so as to be storable and turnable in the up-down vertical direction by the pivots 48a so in the storing recess 46a. Similarly, a storing recess 46b is provided on the side wall surface on the projection side inside the air outlet 55, and the projection-side auxiliary vertical fin 49 is axially supported so as to be storable and turnable in the up-down vertical direction by the pivots 49a in the storing recess 46b. The pivots 47a of the central vertical fin 47 are positioned on the downstream side end portion of the fin, and are axially supported on the most downstream side end portion of the passage 45 inside the register main body 41, that is, on the upper wall portion and the lower wall portion inside the air outlet 55, and the pivots 48a of the retraction-side auxiliary vertical fin 48 and the pivots 49a of the projection-side auxiliary vertical fin 49 are positioned on the upstream side end portions of the fins.

The retraction-side auxiliary vertical fin 48 and the projection-side auxiliary vertical fin 49 are axially supported by the pivots 48a and 49a provided on the upstream side end portions of the fins so that the fins can turn so as to stick out their downstream side end portions to the passage 45 side. In particular, as shown in FIG. 14, when the central vertical fin 47 is turned to the left side, that is, to the retraction side of the air outlet 55, the retraction-side auxiliary vertical fin 48 sticks out its downstream side end portion to the passage 45 side and guides to press the air flow against the central vertical fin 47 side, and the projection-side auxiliary vertical fin 49 turns so as to become parallel to the central vertical fin 47 and make the front end portion of the projection-side auxiliary vertical fin 49 approach the rear end portion of the central vertical fin 47 so that these fins function as one large fin.

Similarly, as shown in FIG. 15, when the central vertical fin 47 is turned to the right side, that is, to the projection side of the air outlet 55, the projection-side auxiliary vertical fin 49 sticks out its downstream side end portion to the passage 45 side and guides to press the air flow against the central vertical fin 47 side, and the retraction-side auxiliary vertical fin 48 turns so as to become parallel to the central vertical fin 57 and make the front end portion of the retraction-side auxiliary vertical fin 48 approach the rear end portion of the central vertical fin 47 so that these fins function as one large fin. These movements of the retraction-side auxiliary vertical fin 48 and the projection-side auxiliary vertical fin 49 are realized by a cam link mechanism 50.

Figure 11:
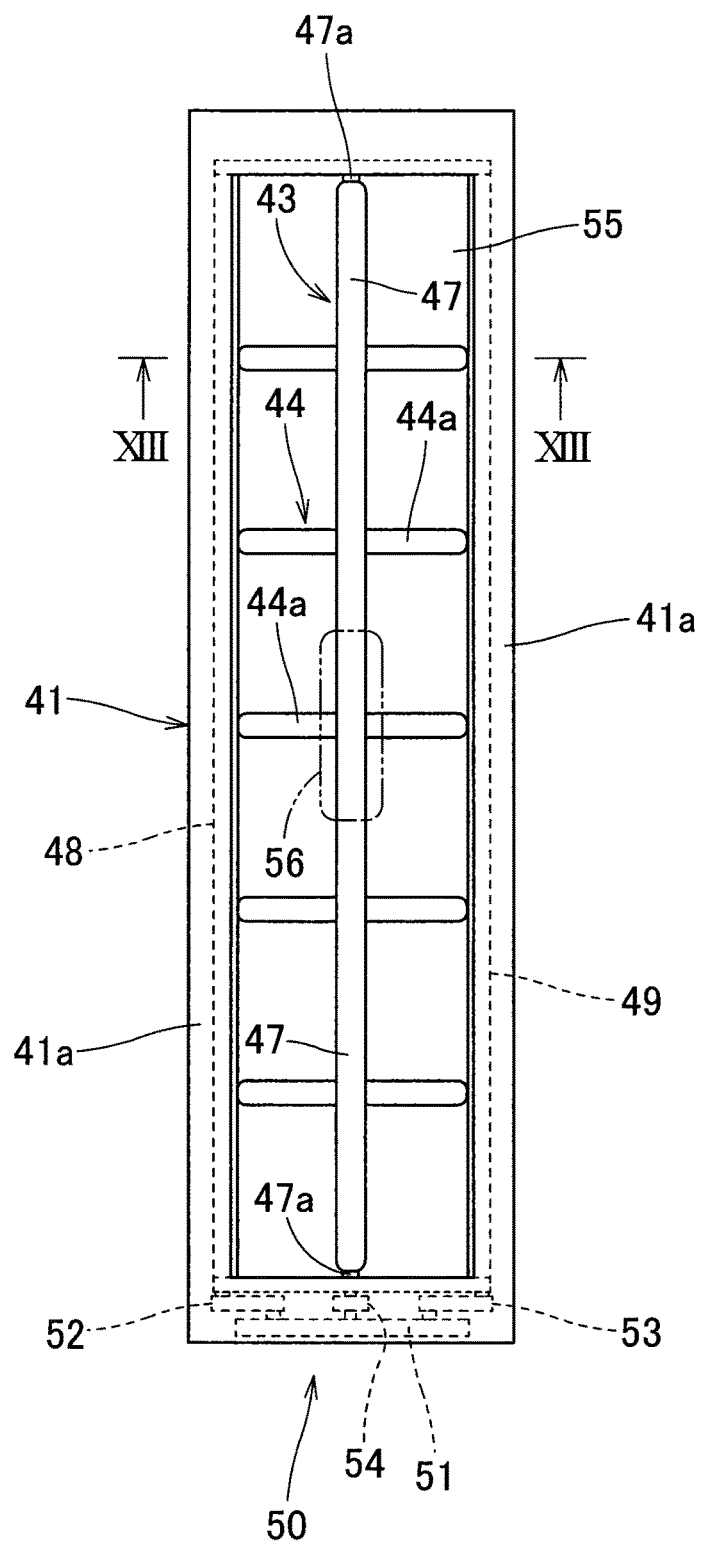
FIG. 11 is a front view of a register showing a third embodiment.
Figure 12:
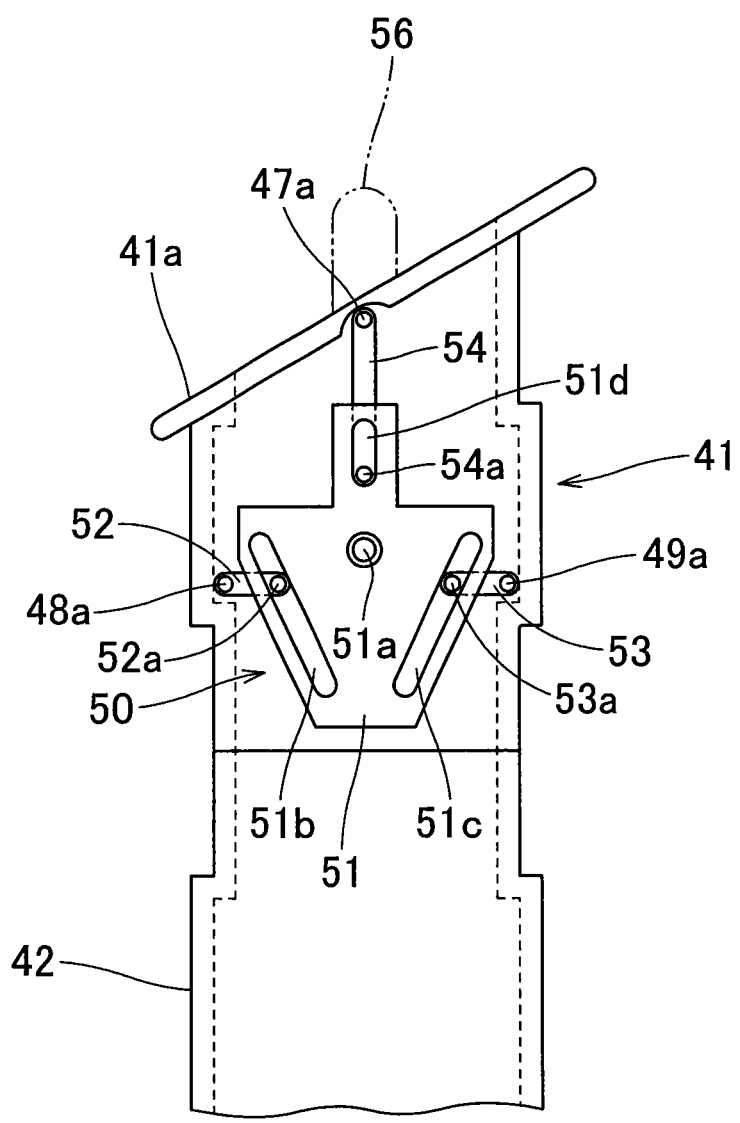
FIG. 12 is a bottom view of the same register.

As shown in FIG. 11, the cam link mechanism 50 is provided on the bottom portion of the register main body 41, and is constituted so as to, when the central vertical fin 47 is turned up or down, turn the retraction-side auxiliary vertical fin 48 and the projection-side auxiliary vertical fin 49 in conjunction with turning of the central vertical fin 47. As shown in FIG. 12, the cam link mechanism 50 includes a link member 54 axially fitted to the pivot 47a of the central vertical fin 47, a link member 52 axially fitted to the pivot 48a of the retraction-side auxiliary vertical fin 48, a link member 53 axially fitted to the pivot 49a of the projection-side auxiliary vertical fin 49, and a cam plate 51 that engages with the link members 52, 53, and 54 via engagement pins 52a, 53a, and 54a, and is provided on the outside of the bottom portion of the register main body 41.

The cam plate 51 of the cam link mechanism 50 is axially supported on the outside of the bottom wall of the register main body 41 turnably by a rotary shaft 51a as shown in FIG. 12. In the cam plate 51, a cam groove 51d for the central vertical fin 47 and cam grooves 51b and 51c for the retraction-side auxiliary vertical fin 48 and the projection-side auxiliary vertical fin 49 are formed. The rotary shaft 51a of the cam plate 51 is disposed on the upstream side further than the tip end positions of the retraction-side auxiliary vertical fin 48 and the projection-side auxiliary vertical fin 49 as shown in FIG. 12, and at symmetrical positions on both right and left sides of the rotary shaft 51a, the cam grooves 51b and 51c are formed into symmetrical shapes. The cam groove 51d for the central vertical fin 47 is formed close to the front portion of the cam plate 51.

The central vertical fin 47 is disposed vertically along the longitudinal direction of the air outlet 55 at substantially the center in the longitudinal direction, and pivots 47a are projected from both upper and lower ends of the fin, and inside the air outlet 55, the central vertical fin 47 is axially supported so as to be turnable right and left via the upper and lower pivots 47a. One pivot 47a penetrates through the bottom wall of the passage 45 and projects to the lower side, and to the tip end of this pivot 47a, the link member 54 is axially fitted. An engagement pin 54a is projected from the tip end of the link member 54 of the central vertical fin 47, and this engagement pin 54a engages in the cam groove 51d of the cam plate 51.

As shown in FIG. 12 and FIG. 13, the pivots 47a of the central vertical fin 47 are positioned at substantially the right-left center of the passage 45, on the left side of the central vertical fin 47, the retraction-side auxiliary vertical fin 48 is disposed vertically parallel, and on the right side of the central vertical fin 47, the projection-side auxiliary vertical fin 49 is disposed vertically parallel. From upper and lower ends of the retraction-side auxiliary vertical fin 48, pivots 48a are projected, and further, from the upper and lower ends of the projection-side auxiliary vertical fin 49, pivots 49a are projected, and the upper and lower pivots 48a and 49a are inserted through the pivot holes provided in the side walls of the register main body 41 and supported turnably. The positions of the pivots 48a and 49a of the retraction-side auxiliary vertical fin 48 and the projection-side auxiliary vertical fin 49 are on the upstream side end portions of each fin, the front portions of the retraction-side auxiliary vertical fin 48 and the projection-side auxiliary vertical fin 49 are free ends, and as described later, according to a turning operation of the central vertical fin 47, the retraction-side auxiliary vertical fin 48 and the projection-side auxiliary vertical fin 49 stick out their front portions being free ends to the passage 45 side.

As shown in FIG. 13, on the left wall surface inside the register main body 41, a storing recess 46a is formed, and the retraction-side auxiliary vertical fin 48 axially supported by the pivots 48a is stored vertically in the storing recess 46a, and is turnable so as to stick out its front end portion to the passage 45 side. On the right wall surface inside the register main body 41, a storing recess 46b is formed, and the projection-side auxiliary vertical fin 49 axially supported by the pivots 49a is stored vertically in the storing recess 46b and is turnable so as to stick out its front end portion to the passage 45 side.

The pivot 48a on the lower side of the retraction-side auxiliary vertical fin 48 penetrates through the bottom wall and projects to the outside, and to the tip end of this pivot 48a, a link member 52 is axially fitted, and from the tip end of the link member 52, an engagement pin 52a is projected. Similarly, the pivot 49a on the lower side of the projection-side auxiliary vertical fin 49 penetrates through the bottom wall and projects to the outside, and to the tip end of this pivot 49a, a link member 53 is axially fitted, and from the tip end of the link member 53, the engagement pin 53a is projected. The engagement pin 52a engages in the cam groove 51b of the cam plate 51 constituted as described above, and the engagement pin 53a engages in the cam groove 51c of the cam plate 51.

With this constitution of the cam link mechanism 50, as shown in FIG. 14, when the central vertical fin 47 is turned left, the retraction-side auxiliary vertical fin 48 turns to stick out its front end portion obliquely so that the front end portion sticks out to the passage 45 side, and on the other hand, the projection-side auxiliary vertical fin 49 turns to orient its front end portion to the central vertical fin 47 side so as to become parallel to and approach the central vertical fin 47 so that these fins function as one large fin. As shown in FIG. 15, when the central vertical fin 47 is turned right, the retraction-side auxiliary vertical fin 48 turns to orient its front end portion toward the central vertical fin 47 side, and becomes parallel to and approaches the central vertical fin 47 so that these fins function as one large fin, and the retraction-side auxiliary vertical fin 48 turns so as to stick out its front end portion obliquely so that the front end portion sticks out to the passage 45 side.

As described above, the cam plate 51 of the cam link mechanism 50 is constituted so that in the cam plate 51, the cam groove 51b in which the engagement pin 52a of the link member 52 of the retraction-side auxiliary vertical fin 48 engages and the cam groove 51c in which the engagement pin 53a of the link member 53 of the projection-side auxiliary vertical fin 49 engages are formed into symmetrical shapes, and the rotary shaft 51a of the cam plate 51 is disposed on the upstream side further than the tip end positions of the retraction-side auxiliary vertical fin 48 and the projection-side auxiliary vertical fin 49, and therefore, as shown in FIG. 14 and FIG. 15, the shape and movement of the cam link mechanism 50 that turns the retraction-side auxiliary vertical fin 48 and the projection-side auxiliary vertical fin 49 in conjunction with movement of the central vertical fin 47 become compact. Accordingly, portions sticking out to the outside of the register main body 41 are eliminated and the register can be fitted even in a small space.

Further, to the central vertical fin 47, as shown in FIG. 11, an operation knob 56 is externally fitted slidably up and down so that the operation knob 56 is grasped so as to be able to turn the central vertical fin 47 in the right-left direction, and by sliding the operation knob 56 in the up-down direction, the rear movable louver 44 is turned up and down to change the wind direction in the up-down direction.

For this structure, for example, as linkage portions, a rack portion (not shown) is provided on the rear portion of the operation knob 56 and a fan-shaped gear is provided on one horizontal fin 44a of the rear movable louver 44, and the rack portion and the gear portion mesh with each other, and when the operation knob 56 is slid, the horizontal fin 44a turns. On end portions of all horizontal fins 44a including the horizontal fin 44a having the gear portion, as shown in FIG. 13, joint shafts 44c are provided so as to deviate from the pivots 44b, and to these joint shafts 44c, one link bar is joined, and when the operation knob 56 is slid up or down on the central vertical fin 47, each horizontal fin 44a of the rear movable louver 44 turns up or down in conjunction with each other to adjust the wind direction in the up-down direction.

Next, operation of the register constituted as described above is described based on FIG. 14 and FIG. 15, etc. To blow wind straight forward of the register, as shown in FIG. 11 and FIG. 13, the central vertical fin 47 of the front vertical louver 43 is oriented straight forward parallel to the front-rear direction of the passage 45. In this state, the retraction-side auxiliary vertical fin 48 and the projection-side auxiliary vertical fin 49 keep their states parallel to the front-rear direction of the passage 45, and are stored in the storing recesses 46a and 46b on both side wall surfaces of the passage 45. Therefore, the air flow flowing in the passage 45 is blown forward to which the central vertical fin 47 is oriented with very small pressure loss and little air resistance from the retraction-side auxiliary vertical fin 48 and the projection-side auxiliary vertical fin 49. Accordingly, as compared with a normal register including three horizontal fins juxtaposed in the air outlet, the pressure loss can be made smaller.

Figure 14A:
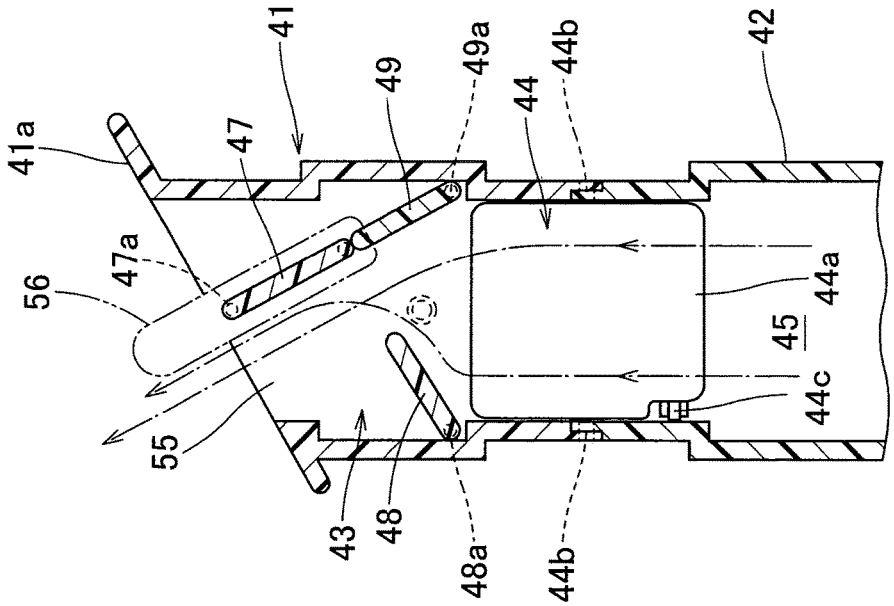
FIG. 14(a) is a bottom view and FIG. 14(b) is a sectional view when the front movable louver is turned left.

On the other hand, when the operation knob 56 is operated to turn the central vertical fin 47 to the left as shown in FIG. 14, the turning force is transmitted to the cam plate 51 of the cam link mechanism 50 via the link member 54, the engagement pin 54a, and the cam groove 51d, and the cam plate 51 turns a predetermined angle in a direction (clockwise in FIG. 14) the reverse of the rotation of the central vertical fin 47 as shown in FIG. 14a.

At this time, by the action of the engagement pin 52a that engages in the cam groove 51b of the cam plate 51 and the link member 52, the retraction-side auxiliary vertical fin 48 turns so as to stick out its downstream side end portion to the inside of the passage 45, and by the action of the engagement pin 53a that engages in the cam groove 51c of the cam plate 51 and the link member 53, the projection-side auxiliary vertical fin 49 turns so as to stick out obliquely to the passage side, and at the same time, the projection-side auxiliary vertical fin 49 orients its front end portion toward the central vertical fin 47 side and becomes parallel to and approaches the central vertical fin 47, that is, the front end portion of the projection-side auxiliary vertical fin 49 becomes parallel to and approaches the rear end portion of the central vertical fin 47 so that these fins function as one large fin.

Figure 14B:
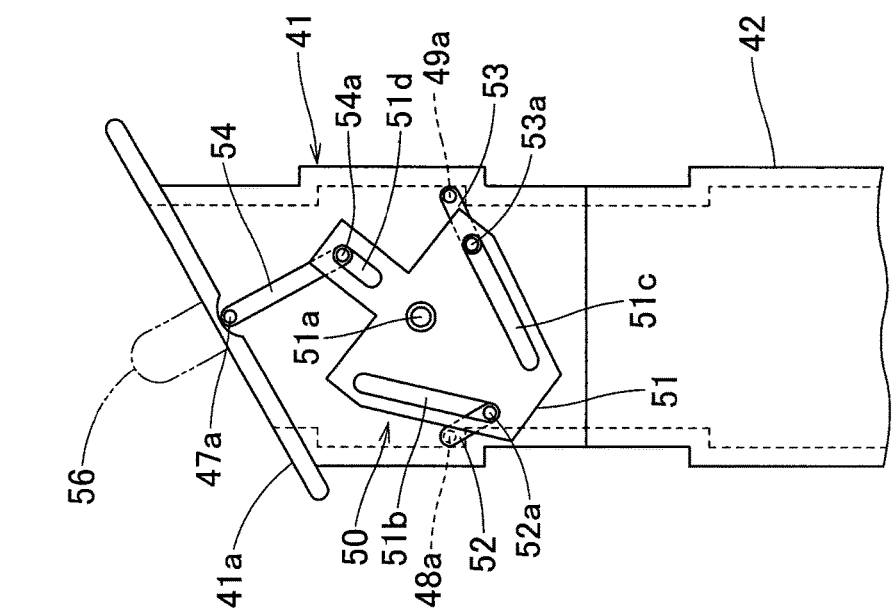

Accordingly, as shown in FIG. 14b, the air flow flowing from the passage 45 toward the air outlet 55 is gathered near the periphery of the center of the passage 45 by the retraction-side auxiliary vertical fin 48 and the projection-side auxiliary vertical fin 49, and particularly, the air flow flowing near the left side wall portion of the passage 45 is pressed against the side surface of the central vertical fin 47 by the retraction-side auxiliary vertical fin 48, and the air flow gathered near the periphery of the central vertical fin 47 flows along the central vertical fin 47 and is blown obliquely leftward to which the central vertical fin 47 is oriented.

As shown in FIG. 14b, the projection-side auxiliary vertical fin 49 orients its front end portion toward the central vertical fin 47 side and becomes parallel to and approaches the central vertical fin 47 so that these fins function as one large fin, and therefore, the air flows flowing toward the central vertical fin 47 and the projection-side auxiliary vertical fin 49 can be efficiently bent obliquely leftward and blown. Further, the retraction-side auxiliary vertical fin 48 and the projection-side auxiliary vertical fin 49 turn so as to stick out from the storing recesses 46a and 46b to the passage 45, so that air flows flowing straight forward in the gaps between these fins and the side wall surfaces are hardly generated, and the air flow gathered near the periphery of the central vertical fin 47 can be flowed along the central vertical fin 47 and efficiently blown obliquely leftward to which the central vertical fin 47 is oriented.

Thus, the retraction-side auxiliary vertical fin 48 turns from the storing recess 46a and operates so as to stick out its downstream side end portion to the inside of the passage 45 to gather the air flow flowing in the passage 45 near the periphery of the central vertical fin 47, and the projection-side auxiliary vertical fin 49 orients its front end portion toward the central vertical fin 47 side and becomes parallel to and approaches the central vertical fin 47 so that these fins function as one large fin, and therefore, an air flow along the central vertical fin 47 can be effectively generated, an air flow flowing straight forward in the gap between the wall surface of the passage 45 and the retraction-side auxiliary vertical fin 48 is prevented from being generated, and unlike a normal register provided with three horizontal fins, the air flow flowing along the central vertical fin 47 is not disturbed. Therefore, even if the register is a thin register and has a narrow and horizontally long air outlet 55, directionality when the central vertical fin 47 of the front movable louver 43 is turned can be significantly improved.

Figure 15A:
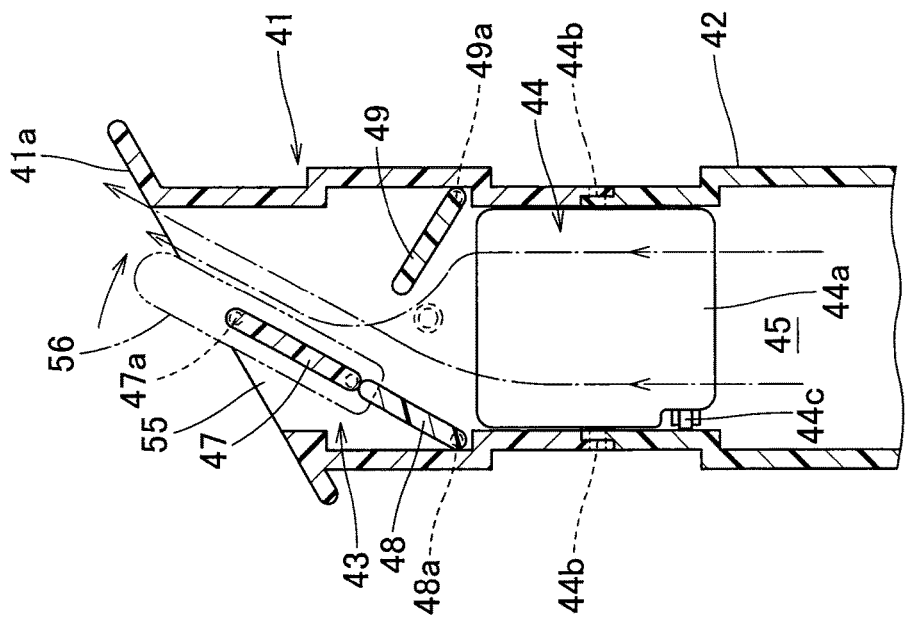
FIG. 15(a) is a bottom view and FIG. 15(b) is a sectional view when the front movable louver is turned right.

On the other hand, while the central vertical fin 47 is in the state shown in FIG. 11, when the operation knob 56 is operated to turn the central vertical fin 47 right as shown in FIG. 15, the turning force is transmitted to the cam plate 51 of the cam link mechanism 50 via the link member 54, the engagement pin 54a, and the cam groove 51d, and the cam plate 51 turns a predetermined angle in a direction (counterclockwise in FIG. 15) the reverse of the rotation of the central vertical fin 47 as shown in FIG. 15a.

Figure 15B:
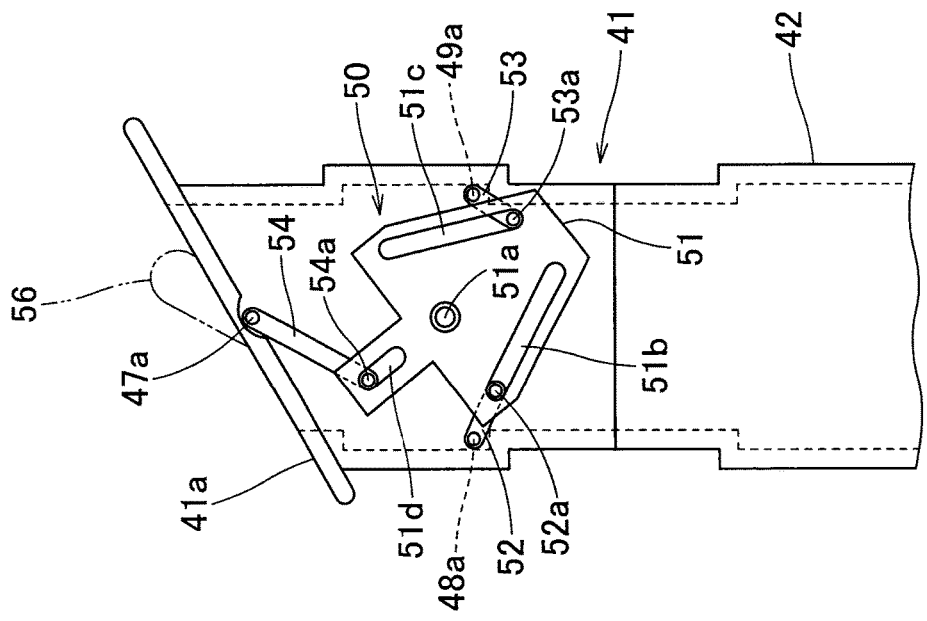

At this time, by the action of the engagement pin 52a that engages in the cam groove 51b of the cam plate 51 and the link member 52, the projection-side auxiliary vertical fin 49 turns so as to stick out its downstream side end portion to the inside of the passage 45 as shown in FIG. 15b, and at the same time, the retraction-side auxiliary vertical fin 48 orients its front end portion toward the central vertical fin 47 side and becomes parallel to and approaches the central vertical fin 47, that is, the front end portion of the retraction-side auxiliary vertical fin 48 becomes parallel to and approaches the rear end portion of the central vertical fin 47 so that these fins function as one large fin.

Accordingly, as shown in FIG. 15b, the air flow flowing from the passage 45 toward the air outlet 55 is gathered near the periphery of the center of the passage 45 by the retraction-side auxiliary vertical fin 48 and the projection-side auxiliary vertical fin 49. In particular, the air flow flowing near right wall surface of the passage 45 is pressed against the side surface of the central vertical fin 47 by the projection-side auxiliary vertical fin 49, so that the air flow flowing inside the passage 45 is blown straight and the downward air flow is not disturbed, and the air flow gathered near the periphery of the central vertical fin 47 flows along the central vertical fin 47. Therefore, even when the narrow and vertically long air outlet 55 inclines to the right to project its right side portion, the air flow can be efficiently bent and blown rightward to which the central vertical fin 47 is oriented.

Further, as shown in FIG. 15b, the retraction-side auxiliary vertical fin 48 orients its front end portion toward the central vertical fin 47 side and becomes parallel to and approaches the central vertical fin 47 so that these fins function as one large fin, and therefore, even when the air outlet 55 inclines to project its right side, by guidance of the central vertical fin 47 and the retraction-side auxiliary vertical fin 48, the air flow can be efficiently bent to the right and blown.

Thus, the projection-side auxiliary vertical fin 49 turns from the storing recess 46b and operates so as to stick out its downstream side end portion to the inside of the passage 45 to gather the air flow flowing in the passage 45 near the periphery of the central vertical fin 47, and the retraction-side auxiliary vertical fin 48 orients its front end portion toward the central vertical fin 47 side and becomes parallel to and approaches the central vertical fin 47 so that these fins function as one large fin, and therefore, an air flow along the central vertical fin 47 is effectively generated, an air flow flowing straight forward in the gap between the side wall surface of the passage 45 and the retraction-side auxiliary vertical fin 48 is prevented from being generated, and unlike a normal register provided with three horizontal fins, the air flow flowing along the central vertical fin 47 is not disturbed. Therefore, even when the register is a thin register and the air outlet 55 inclines to the right or left in the short-side direction, directionality when the central vertical fin 47 of the front movable louver 43 is turned right or left can be significantly improved.

REFERENCE SIGNS LIST

1 Register main body
1a Bezel
2 Retainer
3 Front movable louver
4 Rear movable louver
4a Vertical fin
4b Pivot
4c Joint shaft
5 Passage
6a Storing recess
6b Storing recess
7 Central horizontal fin
7a Pivot
8 Upper auxiliary horizontal fin
8a Pivot
9 Lower auxiliary horizontal fin
9a Pivot
10 Cam link mechanism
11 Cam plate
11a Rotary shaft
11b Cam groove
11c Cam groove
11d Cam groove
12 Link member
12a Engagement pin
13 Link member
13a Engagement pin
14 Link member
14a Engagement pin
15 Air outlet
16 Operation knob
21 Register main body
21a Bezel
22 Retainer
23 Front movable louver
24 Rear movable louver
24a Vertical fin
24b Pivot
24c Joint shaft
25 Passage
26a Storing recess
26b Storing recess
27 Central horizontal fin
27a Pivot
28 Upper auxiliary horizontal fin
28a Pivot
29 Lower auxiliary horizontal fin
29a Pivot
30 Cam link mechanism
31 Cam plate
31a Rotary shaft
31b Cam groove
31c Cam groove
31d Cam groove
32 Link member
32a Engagement pin
33 Link member
33a Engagement pin
34 Link member
34a Engagement pin
35 Air outlet
36 Operation knob
41 Register main body
41a Bezel
42 Retainer
43 Front movable louver
44 Rear movable louver
44a Horizontal fin
44b Pivot 4c Joint shaft
45 Passage
46a Storing recess
46b Storing recess
47 Central vertical fin
47a Pivot
48 Retraction-side auxiliary vertical fin
48a Pivot
49 Projection-side auxiliary vertical fin
49a Pivot
50 Cam link mechanism
51 Cam plate
51a Rotary shaft
51b Cam groove
51c Cam groove
51d Cam groove
52 Link member
52a Engagement pin
53 Link member
53a Engagement pin
54 Link member
54a Engagement pin
55 Air outlet
56 Operation knob
57 Central vertical fin

The invention claimed is:

1. A register comprising:
a narrow and long rectangular-shaped air outlet, with a front movable louver that is provided with a plurality of front fins turnably and disposed inside the air outlet, wherein
the front movable louver is configured so that while one central fin is axially supported at substantially a center of an inside of the air outlet turnably around an axis parallel to a longitudinal direction of the air outlet, a pair of auxiliary fins are axially supported in such a manner that the auxiliary fins are storable in storing recesses provided on wall surfaces on both sides inside the air outlet and turnable around axes parallel to the axis of the central fin while being parallel to the central fin,
the central fin is axially supported turnably by pivots provided on both sides of a vicinity of a downstream side end portion, and the pair of auxiliary fins are axially supported turnably so as to stick out their downstream side end portions to a passage side by pivots provided on both sides of vicinities of upstream side end portions,
a cam link mechanism is provided which turns the auxiliary fins so that when the central fin is turned in a short-side direction of the air outlet, one of the auxiliary fins sticks out its downstream side end portion to the passage side, and the other auxiliary fin becomes parallel to and approaches the central fin with the other auxiliary fin and the central fin being in line so that these fins function as one fin, and
the cam link mechanism is configured so that a plurality of cam grooves are provided in a cam plate axially supported rotatably, and in the cam grooves, an engagement pin of a link joined to one of the pivots of the central fin is engaged and engagement pins of links joined to the pivots of the pair of auxiliary fins are engaged.

2. The register according to claim 1, wherein in the cam plate of the cam link mechanism, two cam grooves in which the engagement pins of the links of the pair of auxiliary fins engage are formed into symmetrical shapes, and a rotary shaft of the cam plate is disposed on an upstream side further than tip end positions of the auxiliary fins.

3. A register comprising:
a narrow and long air outlet that is long in a horizontal direction and short in an up-down vertical direction, with a front movable louver disposed along the horizontal direction in an inner front portion of the air outlet, where the air outlet is formed to incline so as to retract its upper portion to an upstream side and project its lower portion, to a downstream side, wherein
the front movable louver is configured so that while one central horizontal fin is axially supported in the horizontal direction turnably at substantially an up-down center of an inside the air outlet, an upper auxiliary horizontal fin is axially supported so as to be storable and turnable in the horizontal direction in a storing recess provided on an upper wall surface inside the air outlet, and a lower auxiliary horizontal fin is axially supported so as to be storable and turnable in the horizontal direction in a storing recess provided on a lower wall surface inside the air outlet,
the central horizontal fin is axially supported turnably by pivots provided on both sides of a vicinity of a downstream end portion, and the upper auxiliary horizontal fin and the lower auxiliary horizontal fin are axially supported turnably so as to stick out their downstream side end portions to a passage side by pivots provided on both sides of vicinities of upstream end portions,
a cam link mechanism is provided so as to, when the central horizontal fin is turned up or down, turn the upper auxiliary horizontal fin and the lower auxiliary horizontal fin in such a manner that the upper auxiliary horizontal fin or the lower auxiliary horizontal fin sticks out its downstream side end portion to the passage side, and the lower auxiliary horizontal fin or the upper auxiliary horizontal fin becomes parallel to and approaches the central horizontal fin with the lower auxiliary horizontal fin or the upper auxiliary horizontal fin and the central horizontal fin being in line so that these fins function as one fin, and
the cam link mechanism is configured so that a plurality of cam grooves are formed in a cam plate axially supported rotatably, and in the cam grooves, an engagement pin of a link joined to one of the pivots of the central horizontal fin and engagement pins of links joined to the pivots of the upper auxiliary horizontal fin and the lower auxiliary horizontal fin are engaged.

4. The register according to claim 3, wherein in the cam plate of the cam link mechanism, two cam grooves in which the engagement pins of the links of the upper auxiliary horizontal fin and the lower auxiliary horizontal fin engage are formed into symmetrical shapes, and a rotary shaft of the cam plate is disposed on the upstream side further than tip end positions of the upper auxiliary horizontal fin and the lower auxiliary horizontal fin.

5. A register comprising:
a narrow and long air outlet that is long in an up-down vertical direction and short in a horizontal direction, with a front movable louver disposed along the up-down vertical direction in an inner front portion of the air outlet, where the air outlet is inclined so as to retract one side portion to an upstream side and project another side portion to a downstream side, wherein
the front movable louver is configured so that while one central vertical fin is axially supported in the up-down vertical direction turnably at substantially a right-left center of a retraction side inside the air outlet, a retraction-side auxiliary vertical fin is axially supported so as to be storable and turnable in the up-down vertical direction in a storing recess provided on a side wall surface on the retraction side inside the air outlet, and a projection-side auxiliary vertical fin is axially supported so as to be storable and turnable in the up-down vertical direction in a storing recess provided on a side wall surface on a projection side inside the air outlet, the central vertical fin is axially supported turnably by pivots provided on both sides of a vicinity of a downstream side end portion, and the retraction-side auxiliary vertical fin and the projection-side auxiliary vertical fin are axially supported turnably so as to stick out their downstream side end portions to a passage side by pivots provided on both sides of vicinities of upstream side end portions, a cam link mechanism is provided so as to when the central vertical fin is turned right or left, turn the retraction-side auxiliary vertical fin and the projection-side auxiliary vertical fin in such a manner that the retraction-side auxiliary vertical fin and the projection-side auxiliary vertical fin stick out their downstream side end portions to the passage side, and the projection-side auxiliary vertical fin or the retraction-side auxiliary vertical fin becomes parallel to and approaches the central vertical fin with the projection-side auxiliary vertical fin or the retraction-side auxiliary vertical fin and the central vertical fin being in line so that these fins function as one fin, and the cam link mechanism is configured so that a plurality of cam grooves are provided in a cam plate axially supported rotatably, and in the cam grooves, an engagement pin of a link joined to one of the pivots of the central vertical fin is engaged and engagement pins of links joined to the pivots of the retraction-side auxiliary vertical fin and the projection-side auxiliary vertical fin are engaged.

6. The register according to claim 5, wherein in the cam plate of the cam link mechanism, two cam grooves in which the engagement pins of the links of the retraction-side auxiliary vertical fin and the projection-side auxiliary vertical fin engage are formed into symmetrical shapes, and a rotary shaft of the cam plate is disposed on the upstream side further than tip end positions of the retraction-side auxiliary vertical fin and the projection-side auxiliary vertical fin.

\* \* \* \* \*